US011593552B2

(12) United States Patent
Sarkar

(10) Patent No.: US 11,593,552 B2
(45) Date of Patent: Feb. 28, 2023

(54) PERFORMING SEMANTIC SEGMENTATION OF FORM IMAGES USING DEEP LEARNING

(71) Applicant: Adobe Inc., San Jose, CA (US)

(72) Inventor: Mausoom Sarkar, New Delhi (IN)

(73) Assignee: Adobe Inc., San Jose, CA (US)

( * ) Notice: Subject to any disclaimer, the term of this patent is extended or adjusted under 35 U.S.C. 154(b) by 1304 days.

(21) Appl. No.: 15/927,686

(22) Filed: Mar. 21, 2018

(65) Prior Publication Data
US 2019/0294661 A1    Sep. 26, 2019

(51) Int. Cl.
| G06N 3/08 | (2006.01) |
| G06F 40/30 | (2020.01) |
| G06F 40/174 | (2020.01) |
| G06T 7/10 | (2017.01) |

(52) U.S. Cl.
CPC ............ G06F 40/174 (2020.01); G06F 40/30 (2020.01); G06N 3/08 (2013.01); G06T 7/10 (2017.01)

(58) Field of Classification Search
CPC ......... G06F 40/174; G06F 40/30; G06N 3/08; G06N 3/0445; G06N 3/082; G06N 3/084; G06T 7/10; G06T 2207/10008; G06T 2207/20081; G06T 2207/20084; G06T 2207/30176; G06T 7/11; G06V 20/70; G06V 30/412; G06V 30/413
See application file for complete search history.

(56) References Cited

U.S. PATENT DOCUMENTS

| 6,470,094 B1 | 10/2002 | Lienhart et al. |
| 6,473,522 B1 | 10/2002 | Lienhart et al. |
| 8,244,035 B2 | 8/2012 | Hamaguchi |
| 10,395,772 B1 | 8/2019 | Lucas et al. |

(Continued)

OTHER PUBLICATIONS

S. Ajward, N. Jayasundara, S. Madushika and R. Ragel, "Converting printed Sinhala documents to formatted editable text," 2010 Fifth International Conference on Information and Automation for Sustainability, 2010, pp. 138-143, doi: 10.1109/ICIAFS.2010. 5715649. (Year: 2010).*

(Continued)

*Primary Examiner* — Kamran Afshar
*Assistant Examiner* — Randall K. Baldwin
(74) *Attorney, Agent, or Firm* — Keller Preece PLLC

(57) ABSTRACT

The present disclosure relates to generating fillable digital forms corresponding to paper forms using a form conversion neural network to determine low-level and high-level semantic characteristics of the paper forms. For example, one or more embodiments applies a digitized paper form to an encoder that outputs feature maps to a reconstruction decoder, a low-level semantic decoder, and one or more high-level semantic decoders. The reconstruction decoder generates a reconstructed layout of the digitized paper form. The low-level and high-level semantic decoders determine low-level and high-level semantic characteristics of each pixel of the digitized paper form, which provide a probability of the element type to which the pixel belongs. The semantic decoders then classify each pixel and generate corresponding semantic segmentation maps based on those probabilities. The system then generates a fillable digital form using the reconstructed layout and the semantic segmentation maps.

20 Claims, 17 Drawing Sheets

(56) References Cited

U.S. PATENT DOCUMENTS

| | | | |
|---|---|---|---|
| 10,671,892 | B1 | 6/2020 | Daskalov et al. |
| 10,915,788 | B2 | 2/2021 | Hoehne et al. |
| 10,936,863 | B2* | 3/2021 | Simantov ............... G06Q 30/04 |
| 2011/0007970 | A1 | 1/2011 | Saund |
| 2016/0217119 | A1* | 7/2016 | Dakin .................. G06F 40/274 |
| 2017/0091544 | A1 | 3/2017 | Adachi et al. |
| 2018/0181866 | A1* | 6/2018 | Dalle ..................... G06N 5/025 |
| 2020/0082218 | A1 | 3/2020 | Hoehne et al. |
| 2020/0302208 | A1 | 9/2020 | Hoehne et al. |

OTHER PUBLICATIONS

M. Orstavik, and T. Midtbo, "A New Era for Feature Extraction in Remotely Sensed Images by The Use of Machine Learning," Kart og Plan, 2017, vol. 77, pp. 93-107, (Year: 2017).*

Maggiori, E., Tarabalka, Y., Charpiat, G., & Alliez, P. "High-resolution Semantic labeling with convolutional neural networks," arXiv, 2016, doi: 10.48550/arXiv.1611.01962 (Year: 2016).*

Zhang, Y., Lee, K., & Lee, H. (Jun. 2016). Augmenting supervised neural networks with unsupervised objectives for large-scale image classification. In International conference on machine learning (pp. 612-621). PMLR. (Year: 2016).*

Corbelli, A., Baraldi, L., Grana, C., & Cucchiara, R. (Dec. 2016). Historical document digitization through layout analysis and deep content classification. In 2016 23rd International Conference on Pattern Recognition (ICPR) (pp. 4077-4082). IEEE. (Year: 2016).*

Ronneberger, O., Fischer, P., & Brox, T. (Oct. 2015). U-net: Convolutional networks for biomedical image segmentation. In International Conference on Medical image computing and computer-assisted intervention (pp. 234-241). Springer, Cham. (Year: 2015).*

Luo, S., Yang, Y., Yin, Y., Shen, C., Zhao, Y., & Song, M. "DeepSIC: Deep semantic image compression," arXiv, 2018, doi: 10.48550/arXiv.1801.09468 (Year: 2018).*

Wick, C. and Puppe, F., "Fully Convolutional Neural Networks for Page Segmentation of Historical Document Images", arXiv, 2018, doi: 10.1109/DAS.2018.39 (Year: 2018).*

Wang, H., Wang, Y., Zhang, Q., Xiang, S., & Pan, C. (2017). Gated convolutional neural network for semantic segmentation in high-resolution images. Remote Sensing, 9(5), 446. (Year: 2017).*

Chen, Liang-Chieh, et al. "Encoder-Decoder with Atrous Separable Convolution for Semantic Image Segmentation," Computer Vision—ECCV, Lecture Notes in Computer Science vol. 11211. Springer, Cham, 2018, 18 pages.

U.S. Appl. No. 16/539,634, filed Feb. 24, 2021, Notice of Allowance.

U.S. Appl. No. 17/327,382, dated Oct. 24, 2022, Office Action.

U.S. Appl. No. 17/327,382, dated Jan. 4, 2023, Notice of Allowance.

* cited by examiner

Fig. 8

PERFORMING SEMANTIC SEGMENTATION OF FORM IMAGES USING DEEP LEARNING

BACKGROUND

Fillable digital forms have become ubiquitous in modern society, offering a number of benefits over paper forms. For example, using fillable digital forms provides users a faster and more convenient way of submitting information on an electronic device, where submitting a paper form using the same device may require downloading, printing, filling, scanning, and then submitting the form electronically. Additionally, allowing a user to enter information onto a fillable digital form ensures that the entered information is legible and that the information fields are not cluttered with large handwriting or error corrections. Further, because the information is digital, fillable digital forms allow for easier processing of information and reduce the risk of man-made error. Such benefits have motivated many form proprietors to convert their pre-existing paper forms to fillable digital versions.

Despite these advantages, conventional conversion systems have several technological shortcomings that burden paper form conversion because of inefficient and inaccurate operation. For example, conventional conversion systems are typically inefficient, because they employ inefficient models for accepting a paper form and producing a corresponding fillable digital form. In particular, conventional conversion systems are inefficient in that they typically employ basic models that each focus on analyzing a digitized version of a paper form to identify a single element type (e.g., border, text run, image, etc.). Consequently, where paper forms incorporate multiple element types, conventional conversion systems may require several separate models to identify the different element types, requiring multiple levels of analysis and an undesirable amount of time and processing power in converting the paper form.

In addition, conventional conversion systems are often inaccurate in determining which element type a particular pixel of a digitized paper form belongs to (e.g., may risk identifying a particular pixel as belonging to the wrong element type). To illustrate, a pixel may exhibit characteristics of many different element types. Because conventional conversion systems typically use models that each focus on identifying a single element type, the conventional systems may erroneously classify a pixel as one element type because that element type shares characteristics with the pixel's true element type. For example, characteristics of a pixel may indicate that the pixel has a high enough probability of belonging to one element type for a model to classify the pixel as such without recognizing that the characteristics also indicate a higher probability of the pixel belonging to its true element type. When the error happens on a wide scale, the resulting fillable digital form may not operate as intended (i.e., fillable segments on the paper form may not be fillable in the corresponding fillable digital version).

Further, the inaccuracy in converting a paper form to a fillable digital form forces conventional conversion systems to waste valuable computer processing resources to obtain a satisfactory fillable digital form. For example, if a conventional conversion system inaccurately converts a paper form, a form proprietor may make subsequent attempts to correctly convert the form using either the same or a different conventional system. Consequently, as the number of conversion attempts rises, the amount of computer processing resources used in converting a particular form increases significantly.

SUMMARY

One or more embodiments described herein provide benefits and/or solve one or more of the foregoing or other problems in the art with systems, methods, and non-transitory computer readable storage media that improve computing systems by generating fillable digital forms corresponding to paper forms using a form conversion neural network to determine low-level and high-level semantic characteristics of the paper forms. For example, in one or more embodiments, a system employs a form conversion neural network having a neural network encoder and several neural network decoders. In particular, the neural network can include a low-level semantic decoder to determine low-level semantic characteristics and one or more high-level semantic decoders to determine high-level semantic characteristics. Using the determined low-level semantic characteristics and the determined high-level semantic characteristics, the system can generate a fillable digital form corresponding to a paper form. In one or more embodiments, the system's neural network also includes a reconstruction decoder used to reconstruct a layout of the paper form. Consequently, the system can also use the reconstructed layout in generating the fillable digital form. In some embodiments, the form conversion neural network further includes skip connections between the encoder and various of the decoders, which enable layers of the encoder to port lower layer-level outputs directly to one or more of the decoders for more precise processing.

To illustrate, in one or more embodiments, the system trains the form conversion neural network to determine low-level semantic characteristics and high-level semantic characteristics of digitized (e.g., scanned) versions of paper forms. In particular, the system trains the form conversion neural network by taking into account the loss from each of the plurality of decoders and back propagating those losses to the decoders. Subsequently, the system can receive a digitized paper form and use the trained form conversion neural network to determine the low-level semantic characteristics and high-level semantic characteristics of the digitized paper form. Based on the determined low-level and high-level semantic characteristics, the system can then generate a fillable digital form corresponding to the digitized paper form.

The following description sets forth additional features and advantages of one or more embodiments of the disclosed systems, non-transitory computer readable storage media, and methods. In some cases, such features and advantages will be obvious to a skilled artisan from the description or may be learned by the practice of the disclosed embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 8 illustrates a digitized paper form applied to a form conversion neural network in accordance with one or more embodiments;

DETAILED DESCRIPTION

Figure 1:
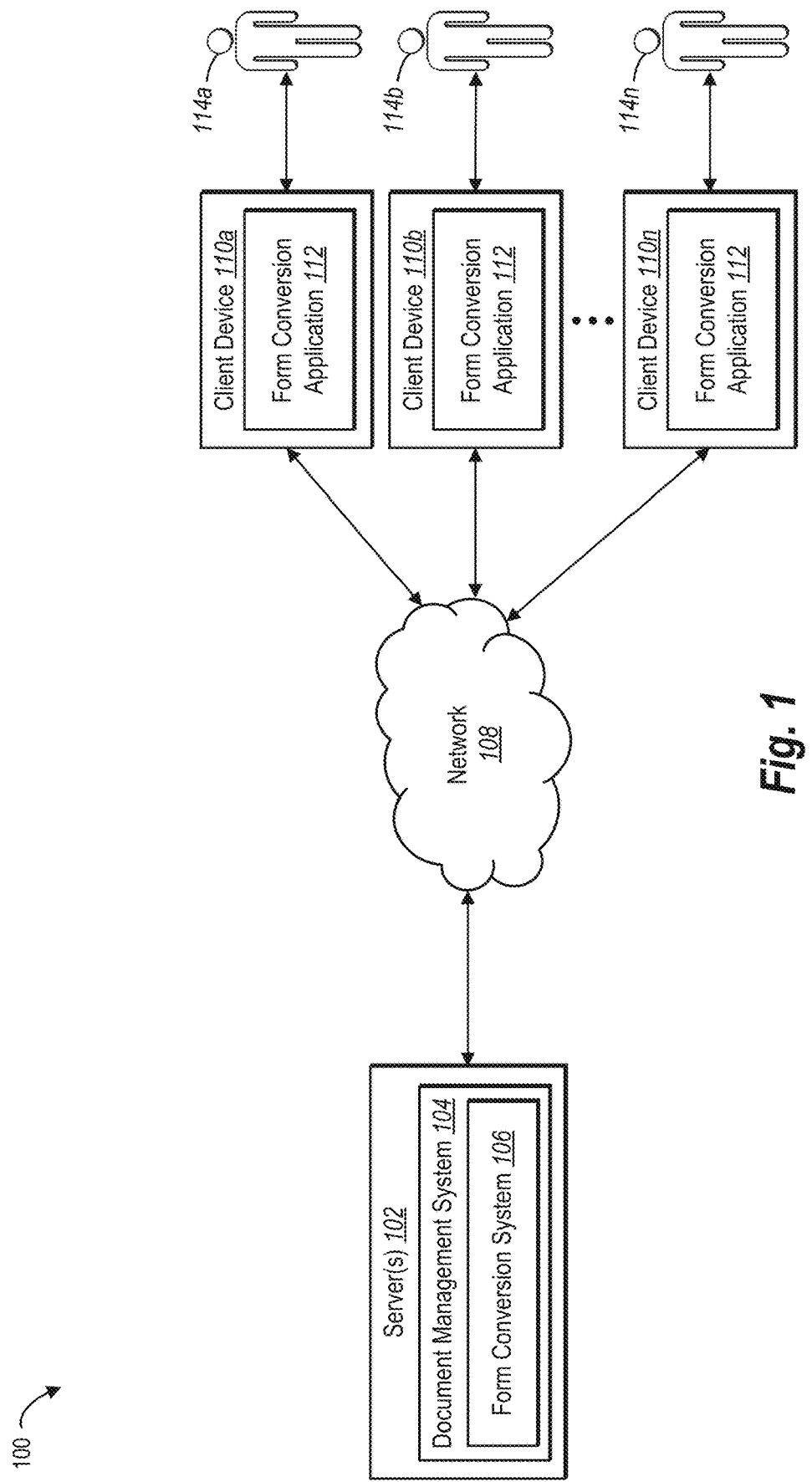
FIG. 1 illustrates an example environment in which a form conversion system can operate in accordance with one or more embodiments.

One or more embodiments described herein include a form conversion system that generates fillable digital forms from paper forms using a form conversion neural network that both determines low-level and high-level semantic characteristics of the paper forms. In particular, the form conversion system can employ a neural network encoder that processes the digitized paper form and outputs a feature map, which is then fed to several neural network decoders that further process the feature map. For example, the form conversion neural network can include a low-level semantic decoder and one or more high-level semantic decoders that process the feature map to determine low-level and high-level semantic characteristics of the digitized paper form. Using the determined low-level semantic characteristics and the determined high-level semantic characteristics, the form conversion system can then generate a fillable digital form corresponding to the digitized paper form. In some embodiments, the form conversion system also incorporates a neural network reconstruction decoder to process the feature map to reconstruct a layout of the digitized paper form, which the form conversion system also uses in generating the digital fillable form. Additionally, the form conversion neural network of the form conversion system can include skip connections that enable layers of the encoder to port low-level layer outputs directly to one or more of the decoders for more precise processing of paper forms.

To provide an exemplary illustration, in one or more embodiments, the form conversion system trains a form conversion neural network to determine low-level and high-level semantic characteristics of digitized paper forms. In particular, the form conversions system trains each of the neural network decoders by modifying their parameters simultaneously based on the loss of each decoder. Using the trained form conversion neural network, the form conversion system can receive a digitized paper form and determine low-level and high-level semantic characteristics and reconstruct a layout of the form. Subsequently, the form conversion system can use the low-level and high-level semantic characteristics to generate a Tillable digital form corresponding to the digitized paper form.

As mentioned above, the form conversion system trains multiple neural network decoders to determine the semantic characteristics of digitized paper forms. In particular, the form conversion system trains the neural network semantic decoders to characterize each pixel of the digitized paper form. For example, the form conversion system can train the neural network semantic decoders to determine the semantic characteristics of each pixel of the digitized paper form and then classify each pixel (i.e., determine to which element type each pixel belongs) based on the determined semantic characteristics.

In one or more embodiments, the form conversion system trains the neural network decoders in parallel. In particular, the form conversion system receives, from each neural network decoder, a loss indicating an error in that particular neural network decoder's determination. Subsequently, the form conversion neural network combines the losses from each of the decoders using an objective function that determines how to minimize the losses. The form conversion system then back propagates the combined loss to each neural network decoder to modify the parameters of each decoder to improve each decoder's accuracy. Furthermore, the form conversion system then back propagates the combined loss to the neural network encoder to update and train the parameters of the neural network encoder together with the neural network decoders.

Further, the form conversion system trains the neural network semantic decoders to separately determine low-level semantic characteristics and high-level semantic characteristics of digitized paper forms. More particularly, the form conversion system trains several neural network semantic decoders to process the feature map produced by the neural network encoder to determine different levels of semantic characteristics of digitized paper forms. For example, the form conversion system can train a neural network low-level semantic decoder to process the feature map to determine the low-level semantic characteristics of each pixel of a digitized paper form. In one or more embodiments, the form conversion system trains the low-level semantic decoder to generate a low-level semantic segmentation map that classifies each pixel of the digitized paper form as a low-level element type based on the determined low-level semantic characteristics of that pixel. For example, the low-level semantic decoder can classify a pixel as belonging to a text run (e.g., a line of text), a widget (e.g., a fillable segment of the form), an image or a semantic element boundary.

Similarly, the form conversion system can train one or more neural network high-level semantic decoders to process the feature map produced by the neural network encoder to determine the high-level semantic characteristics of each pixel of the digitized paper form. In one or more embodiments, the form conversion system trains each high-level semantic decoder to identify a different high-level element type. For example, the form conversion system can train one high-level semantic decoder to identify text blocks (composed of multiple text runs), a second high-level semantic decoder to identify fields (composed of a text block and a widget), and a third high-level semantic decoder to identify lists or tables. In one or more embodiments, the form conversion system trains each of the one or more high-level semantic decoders to generate a high-level semantic segmentation map that classifies each pixel of the digitized paper form as a high-level element type based on the determined high-level semantic characteristics of that pixel.

In some embodiments, the form conversion system additionally trains a neural network reconstruction decoder to generate a reconstructed layout of the digital paper form. In particular, the form conversion system trains the reconstruction decoder to process the feature map obtained from the neural network encoder to produce the reconstructed layout. The reconstructed layout defines the boundaries for elements within the digitized paper form. Once the neural network decoders are trained, the form conversion system can use the reconstructed layout, along with the low-level semantic segmentation map and the one or more high-level semantic segmentation maps, to generate a fillable digital form corresponding to a digitized paper form. In particular, the reconstructed layout provides a basis for correcting erroneous classification of pixels (e.g., making sure that the layout of the fillable digital form matches the layout of the digitized paper form).

Additionally, as mentioned above, the form conversion neural network can include skip connections connecting layers of the neural network encoder to one or more of the neural network decoders. In particular, a skip connection enables the form conversion neural network to directly provide a low-level output from a layer of the neural network encoder to a corresponding layer of one or more of the neural network decoders. For example, a typical neural network encoder processes a digitized paper form using a plurality of encoding layers where each successive encoding layer processes the output of the previous layer. Additionally, typical neural network decoders process the received feature map using a plurality of decoding layers where each successive decoding layer processes the output of the previous layer. By using skip connections, the form conversion system enables the output of an encoder layer to bypass subsequent encoder layers and/or several decoder layers to be input directly into a desired decoder layer so as to capture low level features.

The form conversion system provides several advantages over conventional conversion systems. For example, the form conversion system is more efficient. In particular, the form conversion system employs a more efficient model/structure for processing digitized paper forms to determine corresponding semantic characteristics. For example, by using a form conversion neural network having a plurality of neural network decoders to process the feature map provided by a single neural network encoder in parallel, the form conversion system can analyze a digitized paper form to identify a plurality of element types simultaneously. Consequently, the form conversion system avoids the excessive amounts of time and analytical iterations required by typical form conversion systems for identification of separate semantic elements.

Further, the form conversion system is more accurate than conventional conversion systems. In particular, because the form conversion system jointly trains the neural network decoders, the form conversion system is able to classify each pixel of the digitized paper form more accurately as the training is holistic. Additionally, because of its improved accuracy, the form conversion system avoids wasting valuable computer processing resources. In particular, because the form conversion system more accurately classifies each pixel of the digitized paper form, the system more effectively generates satisfactory fillable digital forms. Consequently, the form conversion system avoids additional attempts at analyzing the digitized paper form and frees those resources that would be used for the additional attempts for other uses.

As a further benefit, the form conversion system reduces memory needs and computational requirements over known systems. For example, the form conversion system reduces the overall training time by using a single neural network rather than separate networks. Stated differently, for a state-of-the-art font classifications system to achieve the same level of accuracy as the form conversion system disclosed herein, the system would require additional training iterations, as well as additional time to converge to achieve comparable results. Further, even with the increased time and resources, a state-of-the-art conversion system would not produce a form conversion neural network that is as robust and stable as one or more embodiments described herein.

As illustrated by the foregoing discussion, the present disclosure utilizes a variety of terms to describe features and benefits of the form conversion system. Additional detail is now provided regarding the meaning of these terms. As used herein, the term "digitized paper form" refers to digital content. In particular, a digitized paper form refers to a digital version of a physical document (e.g., text document, spreadsheet, image, photograph, worksheet, paper form). For example, a digitized paper form can include a scanned paper form, a copy of a paper form, a digital photograph of a paper form, or a digital recreation of a paper form.

Additionally, as used herein, the term "fillable digital form" refers to interactive digital content. In particular, a fillable digital form refers to a digital document that may be modified (e.g., resized, edited, recolored, have text or objects inserted or deleted, have boxes checked) either manually or automatically via an electronic device. For example, a fillable digital form can include a digital text document, spreadsheet, photograph, image, form, or worksheet.

As used herein, the term "neural network" refers to a machine learning model that can be tuned (e.g., trained) based on inputs to approximate unknown functions. In particular, the term form conversion neural network can include a model of interconnected neurons that communicate and learn to approximate complex functions and generate outputs based on a plurality of inputs provided to the model. For instance, the term form conversion neural network includes one or more machine learning algorithms. In particular, the term form conversion neural network can include deep convolutional neural networks (i.e., "CNNs"). In addition, a neural network is an algorithm (or set of algorithms) that implements deep learning techniques that utilize a set of algorithms to model high-level abstractions in data. The description and figures below generally refer to a CNN.

As used herein, the term "neural network encoder" or "encoder" refers to a set of lower neural network layers that generate feature maps based on neural network inputs. In particular, a neural network encoder applies an algorithm (or set of algorithms) to an input to determine features of that input. For example, a neural network encoder can include a deep convolutional neural network encoder. Additionally, as used herein, the term "neural network decoder" or "decoder" refers to a set of higher neural network layers that process feature maps. In particular, a neural network decoder applies an algorithm (or set of algorithms) to a feature map to produce an output. For example, a neural network decoder can include a deep convolutional neural network decoder.

Additionally, as used herein, the term "feature map" or "feature vector" refers to a set of numeric values representing semantic characteristics and attributes. In particular, the term feature map includes a set of values corresponding to latent and/or patent attributes and characteristics related to a document. In one or more embodiments, a feature map is a multi-dimensional dataset that represents document semantics. In the context of a digital document (e.g., a digitized paper form), a feature map includes data representing the semantic characteristics of the pixels of the digital document. In one or more embodiments, a feature map includes a set of numeric metrics learned by a machine learning algorithm such as a form conversion neural network.

As used herein, the term "semantic characteristic" refers to a measurable or otherwise discernable attribute that refers to the composition of a document. In particular, a semantic characteristic refers to a latent and/or patent attribute that indicates an element type (e.g., text, field, widget, boundary) of content within a document. In the context of a digital document (e.g., a digitized paper form), a semantic characteristic can refer to an attribute of a pixel indicating the element type of that pixel. In one or more embodiments, a semantic characteristic is associated with a numeric metric learned by a machine learning algorithm such as a form conversion neural network.

Referring now to the figures, FIG. 1 illustrates a schematic diagram of an environment 100 in which a form conversion system 106 operates. As illustrated in FIG. 1, the environment 100 can include a server(s) 102, a network 108, client devices 110a-110n, associated with users 114a-114n. Although the environment 100 of FIG. 1 is depicted as having a particular number of components, the environment 100 can have any number of additional or alternative components (e.g., any number of servers, client devices, databases, or other components in communication with the form conversion system 106 via the network 108). Similarly, although FIG. 1 illustrates a particular arrangement of the server(s) 102, the network 108, client devices 110a-110n, and users 114a-114n, various additional arrangements are possible.

The server(s) 102, the network 108, and the client devices 110a-110n may be communicatively coupled with each other either directly or indirectly (e.g., through the network 108, networks are discussed in greater detail below in relation to FIG. 16). Moreover, the server(s) 102, and client devices 110a-110n may include any type of computing device (including one or more computing devices as discussed in greater detail below in relation to FIG. 16).

As mentioned above, the environment 100 includes the server(s) 102. The server(s) 102 can generate, store, receive, and/or transmit data, including data regarding a digitized paper document or a Tillable digital form. For example, the server(s) 102 may receive data from the client device 110a and send data to the client device 110b. In one or more embodiments, the server(s) 102 can comprise a data server. The server(s) 102 can also comprise a communication server or a web-hosting server.

As shown in FIG. 1, the server(s) 102 can include a document management system 104. In particular, the document management system 104 provides functionality by which a user (e.g., any of the users 114a-114n) can generate, manage, edit, and/or store digital content. For example, the user 114a can generate a new digital document using the client device 110a. Subsequently, the user 114a can use the client device 110a to send the digital document, via the network 108, to the document management system 104 hosted on the server(s) 102. The document management system 104 then provides many options that the user 114a may use to store the digital document, organize the digital document into a folder, and subsequently search for, access, view, and edit the digital document. In one or more embodiments, the document management system 104 can comprise or operate in connection with digital software applications such as ADOBE® CREATIVE CLOUD® or ADOBE® ACROBAT®. "ADOBE," "CREATIVE CLOUD," and "ACROBAT" are either registered trademarks or trademarks of Adobe Systems Incorporated in the United States and/or other countries.

Additionally, the server(s) 102 can execute or implement the form conversion system 106. In one or more embodiments, the form conversion system 106 uses the server(s) 102 to convert a digitized paper form into a fillable digital form. For example, the server(s) 102 can receive, via the network 108, a digitized paper form from the client device 110a. The server(s) 102 can then determine the semantic characteristics of the digitized paper form. In particular, the server(s) 102 can determine the semantic characteristics of the pixels of the digitized paper form. In one or more embodiments, the server(s) 102 uses a trained form conversion neural network to analyze the digitized paper form to determine the semantic characteristics. Additionally, the server(s) 102 can use the trained form conversion neural network to reconstruct a layout of the digitized paper form. Subsequently, the server(s) 102 can generate a fillable digital form corresponding to the digitized paper form based on the determined semantic characteristics and the reconstructed layout. The server(s) 102 can then transmit the fillable digital form back to the client device 110a and/or to one or more of the other client devices 110b-110n. Additionally, or alternatively, the server(s) 102 may store the fillable digital form for access by the client devices 110a-110n.

The form conversion system 106 can be implemented in whole, or in part, by the individual elements of the environment 100. Although FIG. 1 illustrates the form conversion system 106 being implemented by the server(s) 102, it will be appreciated that one or more components of the form conversion system 106 can be implemented in any of the components of the environment 100, such as for example the client devices 110a-110n. The components of the form conversion system 106 will be discussed in more detail with regard to FIG. 14 below.

In one or more embodiments, the client devices 110a-110n include client devices that allow users of the devices (e.g., the users 114a-114n) to submit digitized paper documents and/or receive and access fillable digital documents. For example, the client devices 110a-110n can include smartphones, tablets, desktops computers, laptop computers, or other electronic devices. The client devices 110a-110n can include one or more applications (e.g., the form conversion application 112) that allows the users 114a-114n to submit digitized paper documents and/or receive and access fillable digital documents. For example, the form conversion application 112 can include a software application installed on the client devices 110a-110n. Additionally, or alternatively, the form conversion application 112 can include a software application hosted on the server(s) 102, which may be accessed by the client devices 110a-110n through another application, such as a web browser.

Figure 2:
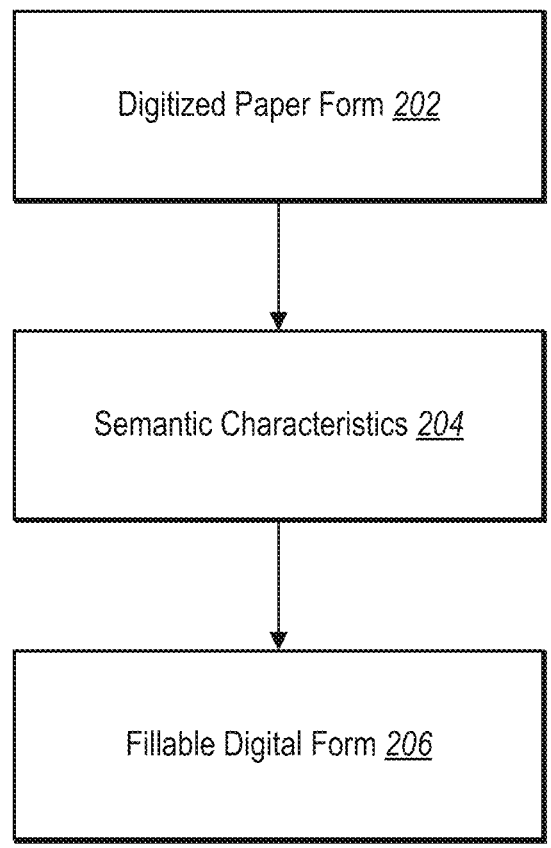
FIG. 2 illustrates a block diagram illustrating an overview of generating a fillable digital form in accordance with one or more embodiments.

FIG. 2 illustrates a schematic diagram of a process for generating a fillable digital form corresponding to a digitized paper form in accordance with one or more embodiments of the form conversion system 106. As shown in FIG. 2, the form conversion system 106 receives a digitized paper form 202 and determines the semantic characteristics 204 of the digitized paper form 202. In particular, the form conversion system 106 analyzes the pixels of the digitized paper form 202 to determine the semantic characteristics 204 of that pixel as will be discussed with more detail below with reference to FIG. 6.

By analyzing the digitized paper form 202 on a pixel level, the form conversion system 106 can distinguish between a first pixel that is positioned proximate to a second pixel but includes semantic characteristics that indicate the first pixel is of a different element type than the second pixel. For example, a first pixel and a second pixel can be positioned near one another on the digitized paper form but have differing semantic characteristics indicating that the first pixel is part of a text run and the second pixel is part of an image. Therefore, analyzing the digitized paper form 202 on a pixel level allows the form conversion system 106 to better determine the element type to which the first and second pixels belong, rather than incorrectly determining that the first and second pixels are both part of a text run or part of an image based on their close proximity.

Figure 3:
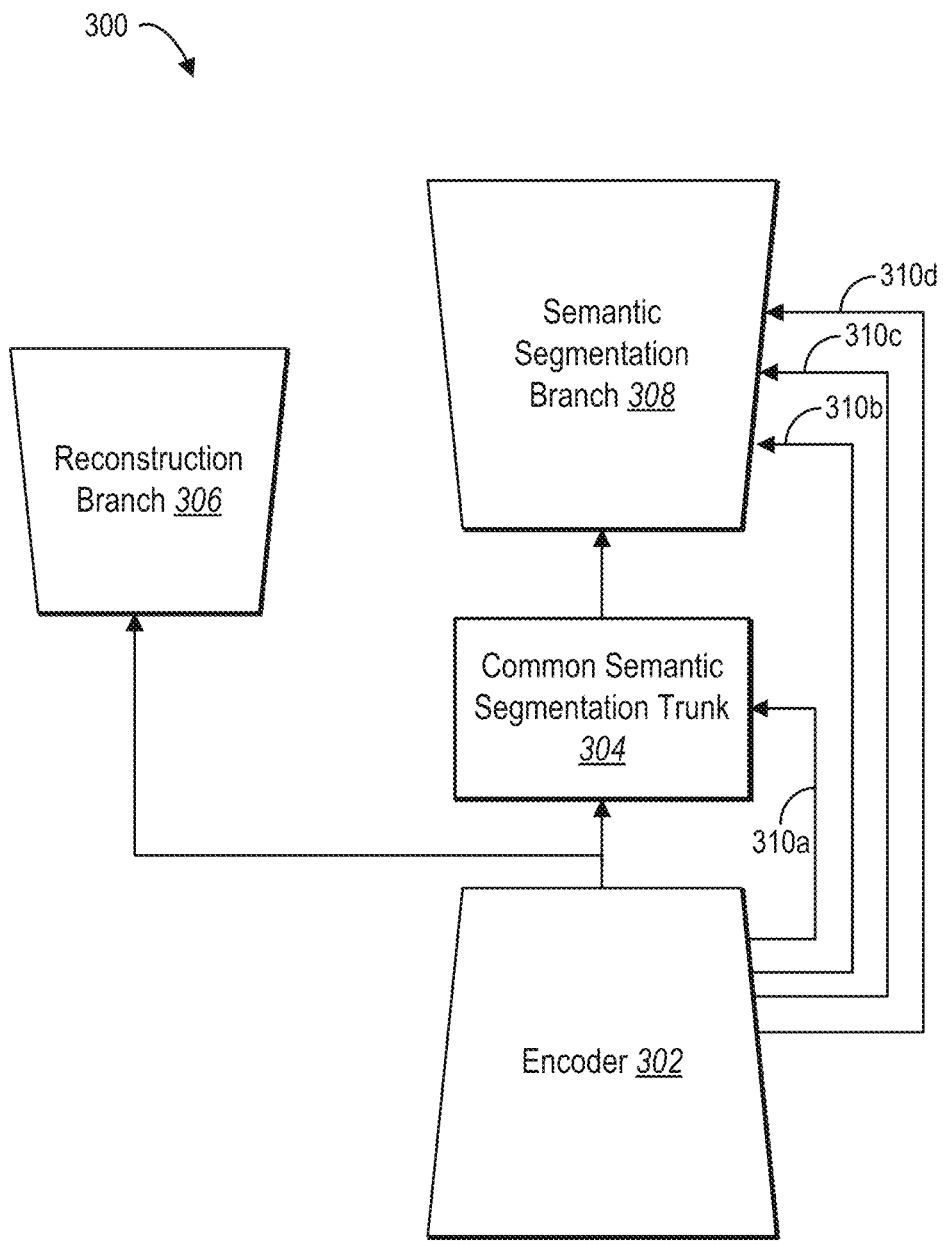
FIG. 3 illustrates a schematic of a simplified form conversion neural network for determining semantic characteristics in accordance with one or more embodiments.

The form conversion system 106 then uses the semantic characteristics 204 to generate a fillable digital form 206. In one or more embodiments, the form conversion system 106 generates one or more semantic segmentation maps classifying each pixel as a particular element type based on the determined semantic characteristics of that pixel and generates the digital fillable form based on those semantic segmentation maps. The fillable digital form 206 will correspond to the digitized paper form 202 in that the function of the pixels of the fillable digital form 206 will mirror the function of the pixels intended by the digitized paper form 202 (and the corresponding segments of the physical document from which the digitized paper form originated). For example, the form conversion system 106 will convert portions of the digitized paper form 202 that were intended to be widgets in which a user could provide input (e.g., write text) into fillable digital widgets into which the user can provide digital input (e.g., type text). More specifically, the form conversion system 106 can utilize a form conversion neural network FIG. 3 illustrates an overview of the architecture of a form conversion neural network 300 used by one or more embodiments of the form conversion system 106 to determine the semantic characteristics of a digitized paper form. In general, the form conversion neural network 300 receives a digitized paper form (e.g., the digitized paper form 202 of FIG. 2) and determines the semantic characteristics of the pixels of the digitized paper form. The form conversion neural network 300 can then generate one or more semantic segmentation maps based on the determined semantic characteristics of each pixel as will be discussed in more detail with reference to FIG. 6.

As shown in FIG. 3, the form conversion neural network 300 includes an encoder 302, a common semantic segmentation trunk 304, a reconstruction branch 306, a semantic segmentation branch 308, and a plurality of skip connections 310a-310d. In particular, the encoder 302 receives and processes the digitized paper form to generate a feature map that is passed onto the common semantic segmentation trunk 304 and the reconstruction branch 306. The reconstruction branch 306 then processes the feature map to reconstruct a layout of the digitized paper form. In one or more embodiments, the reconstruction branch includes one or more reconstruction decoders. Concurrently, the common semantic segmentation trunk 304 also processes the feature map and passes the processed feature map to the semantic segmentation branch 308. In one or more embodiments, the common semantic segmentation trunk 304 includes a plurality of neural network RNN layers and a plurality of neural network common layers. The semantic segmentation branch 308 then further processes the feature map updated by the common semantic segmentation trunk 304 to determine the semantic characteristics of the digitized paper form. In one or more embodiments, the semantic segmentation branch 308 includes a plurality of semantic decoders that each determine a different type/level of semantic characteristics. For example, the semantic segmentation branch 308 can include one or more low-level semantic decoders to determine low-level semantic characteristics and one or more high-level semantic decoders to determine high-level semantic characteristics. Based on the determined semantic characteristics, the semantic segmentation branch 308 can generate one or more semantic segmentation maps that provide the element type to which the pixels of the digitized paper form belong.

As will be discussed in more detail with reference to FIG. 6, in one or more embodiments, the encoder 302, the common semantic segmentation trunk 304, the reconstruction branch 304, and the semantic segmentation branch 308 each include a plurality of neural network layers. In general, each successive neural network layer processes the output of the previous layer. By using the skip connections 310a-310d, the form conversion neural network 300 can route a lower layer-level output (e.g., a low layer-level feature map) from a layer of the encoder 302 directly to a corresponding layer of either the common semantic segmentation trunk 304 or the semantic segmentation branch 308. Consequently, the encoder-layer-level feature map that is routed through one of the skip connections 310a-310d avoids intervening processing, allowing for more precise determination of the semantic characteristics of the digitized paper form by using lower level abstractions from the encoder 302.

Figure 4:
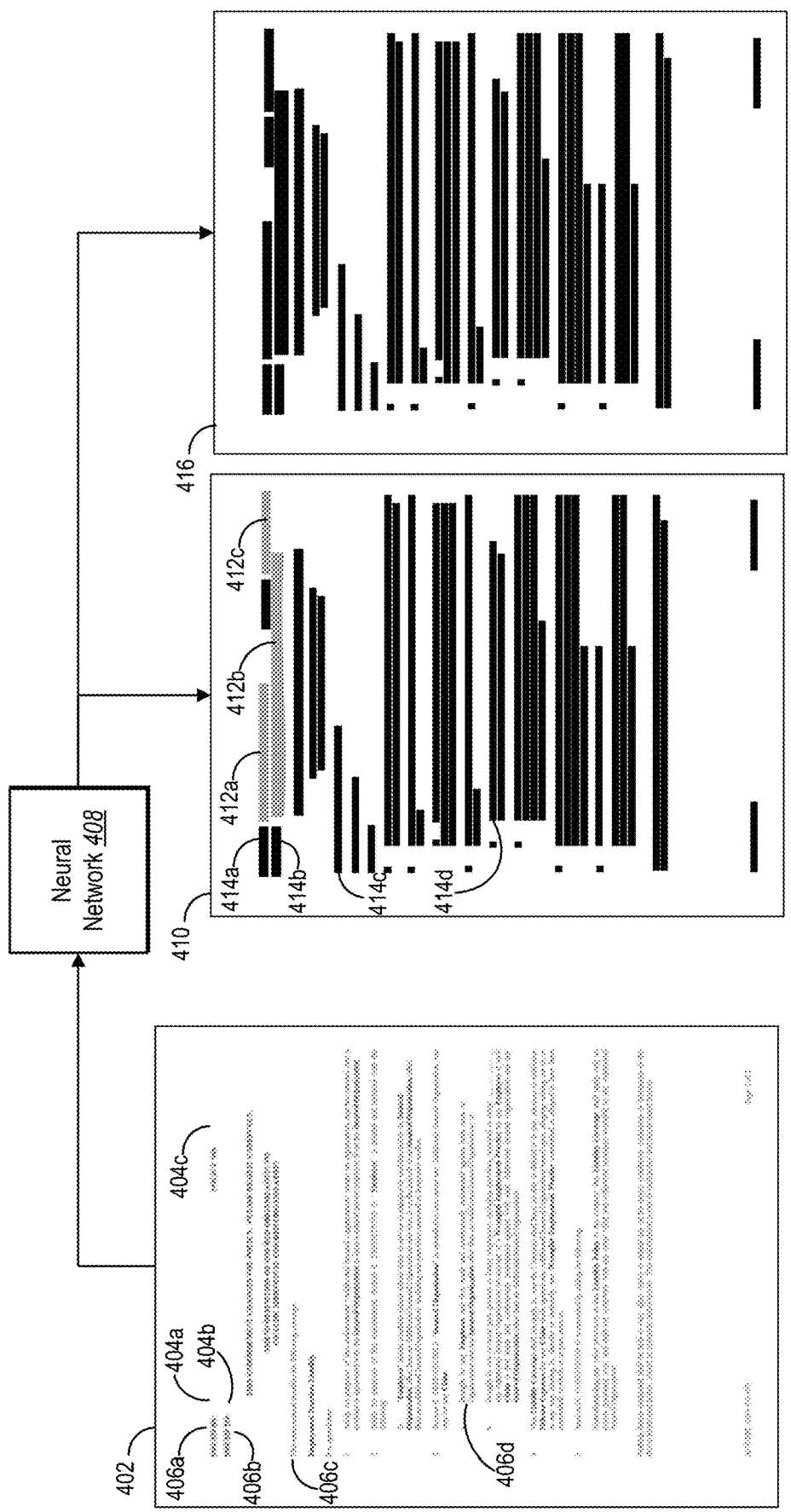
FIG. 4 illustrates a schematic of a form conversion neural network generating a semantic segmentation map and a reconstructed layout in accordance with one or more embodiments.

FIG. 4 illustrates a block diagram of the form conversion system 106 using a form conversion neural network 408 to generate a semantic segmentation map and a reconstructed layout of the digitized paper form 402. In particular, FIG. 4 shows the digitized paper form 402. Though the present disclosure discusses the operation of the form conversion system 106 in terms of converting forms, one having ordinary skill in the art will appreciate that the form conversion system can function to convert any type of physical document. In particular, the digitized paper form 402 can represent the digital version of any physical document.

As shown in FIG. 4, the digitized paper form 402 includes several semantic element types. For example, the digitized paper form 402 includes the widgets 404a-404c and text runs represented by the text runs 406a-406d. As used herein, the term "widget" refers to fillable space on a form. In particular, a widget refers to an area of the form designated as the area in which a form filler is to insert input. For example, a widget can include an area in which a form filler can write text or an area in which a form filler can indicate a selection (e.g., a check box). Additionally, as used herein, the term "text run" refers to an area on a form in which text is located. In particular, a text run refers to a continuous line of text located on a form. For example, a text run can include a line of text running the entire width of the form or a line of text extending until interrupted by another element type.

As shown in FIG. 4, the form conversion system 106 supplies the digitized paper form 402 to the form conversion neural network 408. In one or more embodiments, the general architecture of the form conversion neural network 408 is the same as the architecture of the form conversion neural network 300 discussed with reference to FIG. 3. In particular, the form conversion neural network 408 processes the digitized paper form 402 to determine the corresponding semantic characteristics. In one or more embodiments, the form conversion neural network 408 determines the semantic characteristics using a semantic segmentation branch (e.g., the semantic segmentation branch 308). More specifically, the form conversion neural network 408 determines the semantic characteristics of the pixels of the digitized paper form 402. Based on the determined semantic characteristics, the form conversion neural network 408 generates the semantic segmentation map 410. Although FIG. 4 illustrates one resulting semantic segmentation map, one or more embodiments generate multiple semantic segmentation maps as will be discussed in more detail with reference to FIG. 6. As can be seen, the semantic segmentation map 410 provides an indication of the element type to which the pixels of the digitized paper form 402 correspond. For example, the semantic segmentation map 410 includes the widgets 412a-412c corresponding to the widgets 404a-404c of the digitized paper form 402. Additionally, the semantic segmentation map 410 includes the text runs 414a-414d corresponding to the text runs 406a-406d of the digitized paper form 402.

As just mentioned, the form conversion neural network 408 uses the determined semantic characteristics to generate the semantic segmentation map 410. Specifically, each determined semantic characteristics of a pixel can correspond to one or more element types. For example, one semantic characteristic can indicate that a pixel can be part of a widget, a text run, or an image as each element type may share that particular semantic characteristic. Based on the determined semantic characteristics of a pixel, the form conversion neural network 408 determines element type probabilities for that pixel. For example, the form conversion neural network 408 may determine that a pixel of the digitized paper form 402 has a probability of 0.5 that it is part of a widget, a probability of 0.3 that it is part of a text run, and a probability of 0.2 that it is part of an image. Based on the determined element type probabilities, the form conversion neural network 408 classifies each pixel as a particular element type. In one or more embodiments, the form conversion neural network 408 classifies the pixel as the element type corresponding to the highest element type probability for that pixel. For example, after determining that a pixel's highest element type probability is a 0.5 probability that the pixel is part of a widget, the form conversion neural network 408 can classify that pixel as a widget pixel. When all pixels of the digitized paper form 402 have been classified, the form conversion neural network 408 generates the semantic segmentation map 410 where each pixel is represented as its determined element type.

As shown in FIG. 4, the form conversion neural network 408 also generates the reconstructed layout 416. In one or more embodiments, the form conversion neural network 408 generates the reconstructed layout 416 using a reconstruction branch (e.g., the reconstruction branch 306). The reconstructed layout 416 defines the boundaries for the elements within the digitized paper form 402. To illustrate the need of the reconstructed layout 416, when the form conversion neural network 408 classifies each pixel of the of the digitized paper form 402, it can misclassify certain pixels based on those pixels having a probability of belonging to a certain element type that is higher than the probability of the pixel's true element type. For example, a pixel may belong to the widget class but have semantic characteristics indicating a high probability that the pixel belongs to the image class; therefore, the form conversion neural network 402 can erroneously classify that pixel as part of an image. When such an error occurs on a wider scale, the form conversion neural network 408 can generate a semantic segmentation map that misrepresents the element type of several pixels. For example, the widget 412b of the semantic segmentation map 410 includes a jagged border, representing that the pixels near the bottom of the widget 412b had corresponding semantic characteristics that indicated those pixels had a higher probability of being some element type other than a widget. Generating a fillable digital form based solely on an erroneous semantic segmentation map could result in a digital form that doesn't function satisfactorily (e.g., the widget of the fillable digital form corresponding to the widget 412b may not properly accept input) or may simply look incorrect or of poor quality.

In one or more embodiments, the form conversion neural network 408 uses the reconstructed layout 416 to correct errors included within the semantic segmentation map 410 or otherwise help ensure that the form/layout of the digitized paper form 402 is maintained. As mentioned, the reconstructed layout 416 defines the boundaries of each semantic element within the digitized paper form 402. In particular, the reconstructed layout 416 includes layout boxes corresponding to each element within the digitized paper form 402. Though the layout boxes do not provide an indication of the element type to which each pixel within the layout box belongs, they do indicate that—whatever the element type is—pixels belonging to that instantiation of the semantic element do not extend outside that box and every pixel falling within that box belongs to the same element type.

When processing the digitized paper form 402, the form conversion system 106 can use the reconstructed layout 416 in conjunction with the semantic segmentation map 410 to generate a corresponding fillable digital form with each pixel correctly classified. For example, if the semantic segmentation map 410 includes an element box with a jagged border (e.g., the widget 412b) the form conversion system 106 can use the corresponding layout box in the reconstructed layout 416 to determine that some of the pixels have been misclassified. In some embodiments, the form conversion system 106 can then reclassify the misclassified pixels based on the layout box provided in the reconstructed layout 416. For example, in one or more embodiments, the form conversion system 106 determines the classification of the majority of the pixels within the layout box and reclassifies the misclassified pixels to match the classification of the majority.

Figure 5A:
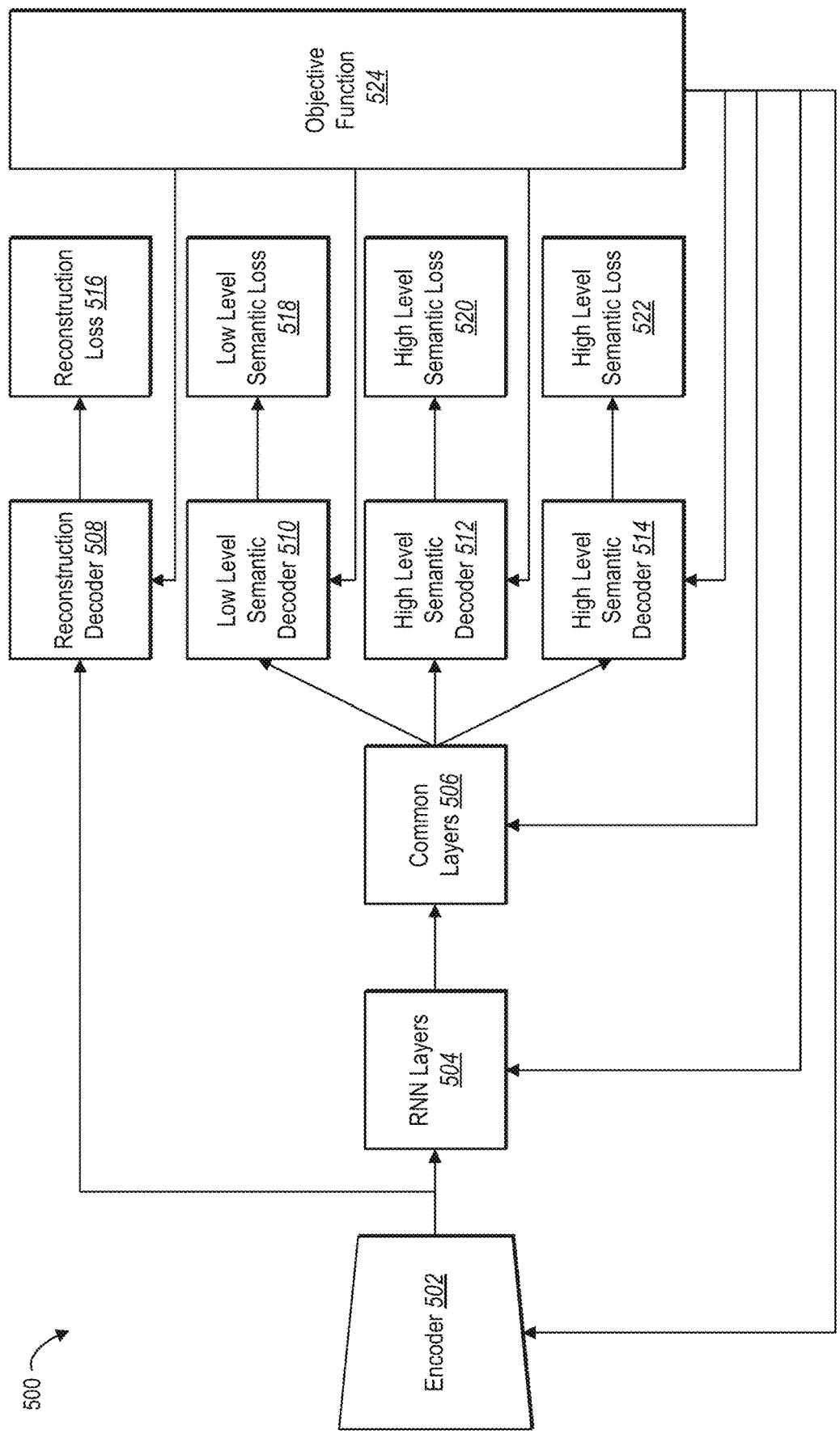
FIGS. 5A-5B each illustrate a schematic of a process of training a form conversion neural network in accordance with one or more embodiments.

FIG. 5A illustrates the form conversion system 106 training a form conversion neural network 500 to determine semantic characteristics and to generate a reconstructed layout of a digitized paper form. As shown in FIG. 5A, the general architecture of the form conversion neural network 500 is similar to that of the form conversion neural network 300 of FIG. 3. In particular, the form conversion neural network 500 includes an encoder 502, several RNN layers 504 and common layers 506 (collectively the common semantic segmentation trunk 304), the reconstruction decoder 508 (the reconstruction branch 306), and the low-level semantic decoder 510 and high-level semantic decoders 512-514 (collectively the semantic segmentation branch 308). As shown in FIG. 5A, when in training, the form conversion neural network 500 also includes the reconstruction loss 516, the low-level semantic loss 518, the high-level semantic losses 520-522, and the objective function 524. For the purpose of simplicity, FIG. 5A illustrates the form conversion neural network 500 without skip connections.

As just mentioned, the form conversion neural network 500 includes a low-level semantic decoder 510 and the high-level semantic decoders 512-514. The different decoders allow the form conversion neural network 500 to analyze digitized paper forms to identify multiple element types simultaneously. For example, the low-level semantic decoder 510 can identify low-level semantic characteristics, such as those indicating that a particular pixel is part of a text run, a widget, an image, or a border. The high-level semantic decoders 512-514 can identify higher level semantic characteristics, particularly those indicating a relation between lower level semantics. In particular, the form conversion neural network 500 can use each of the high-level semantic decoders 512-514 to identify a different level of semantics within a hierarchy of semantics. For example, the form conversion neural network 500 can use the high-level semantic decoder 512 to identify text blocks, fields, lists, and tables. As used herein, the term "text blocks" refers to an element type that includes several segments of text. In particular, a text block can refer to a portion of a form that includes multiple text runs. For example, a text block can include a paragraph of text that is broken into several lines (i.e., text runs) on a page of a form. Additionally, as used herein, the term "fields" refers to an element type that includes two or more lower level element types. For example, a field can include a text block and a widget). Though FIG. 5A shows the form conversion neural network 500 including the high-level semantic decoders 512-514, some embodiments include less or more high-level semantic decoders to identify less or more high-level element types according to the current needs of the form conversion system 106.

Further, each of the low-level semantic decoder 510 and the high-level semantic decoders 512-514 can generate a semantic segmentation map (similar to the semantic segmentation map of 410 of FIG. 4) that maps out the identified element types based on the determined semantic characteristics of the respective decoder.

The form conversion system 106 trains the form conversion neural network 500 using training digitized paper documents. In some embodiments, the training digitized paper documents already have corresponding ground truth semantic segmentation maps and ground truth reconstructed layouts. For example, the form conversion system 106 may obtain these pre-existing semantic segmentation maps and reconstructed layouts by accessing an analytics storage database. In particular, the form conversion system 106 can use the semantic segmentation maps and reconstructed layouts as ground truths for determining the losses of each of the decoders of the form conversion neural network 500 during training.

To train the form conversion neural network 500, the form conversion system 106 uses the form conversion neural network 500 to process the training digitized paper form in a procedure that is similar to how the form conversion neural network 500 would process a digitized paper form once trained, which will be discussed in more detail below with regard to FIG. 6. In general, the form conversion system 106 inputs the training digitized paper form into the encoder 502, which processes the training digitized paper form and outputs a training feature map to the reconstruction decoder 508 and the RNN layers 504. The reconstruction decoder 508 then processes the training feature map and outputs a reconstructed layout of the training digitized paper form. To generate the reconstruction loss 516, the conversion neural network 500 compares the compares the reconstructed layout to a ground truth layout. In one or more embodiments, the ground truth includes a pre-existing reconstructed layout corresponding to the training digitized paper form. In one or more embodiments, the reconstruction loss 516 uses Euclidean loss to determine the error. Subsequently, the reconstruction loss 516 outputs the determined loss to the objective function 524.

Concurrently, the RNN layers 504 and the common layers 506 also process the training feature map received from the encoder 502 and pass the output (e.g., an updated or refined feature map) to the low-level semantic decoder 510 and the high-level semantic decoders 512-514. The low-level semantic decoder 510 further processes the feature map and outputs a low-level semantic segmentation map. Each of the high-level semantic decoders 512-514 also further process the training feature map and outputs a high-level semantic segmentation map. In particular, the low-level semantic loss 518 and the high-level semantic losses 520-522 compare their respective semantic segmentation maps to a ground truth. For example, the ground truth for the low-level semantic segmentation map can be a pre-existing low-level semantic segmentation map that accurately depicts the low-level element types (e.g., text runs, widgets, images, boundaries) of the training digitized paper form. Similarly, the ground truth for the high-level semantic segmentation maps can includes pre-existing high-level semantic segmentation maps that accurately depict the high-level element types (e.g., text blocks, fields, lists, tables etc.) of the training digitized paper form. In one or more embodiments, the low-level semantic loss 518 and the high-level semantic losses 520-522 use cross entropy to determine the error in each of the decoders' output. Subsequently, the low-level semantic loss 518 and the high-level semantic losses 520-522 output the determined loss to the objective function 524.

The objective function 524 combines (e.g., sums) the losses received from the reconstruction loss 516, the low-level semantic loss 518, and the high-level semantic losses 520-522 and determines how to minimize the sum of the losses so as to train the form conversion neural network 500 to operate more accurately overall. In particular, the objective function 524 determines how to modify the parameters of each of the encoder 502, the RNN layers 504, the common layers 506, the reconstruction decoder 508, the low-level semantic decoder 510, and the high-level semantic decoders 512-514 to improve the accuracy of the form conversion neural network 500. Subsequently, the objective function 524 back propagates the combined loss to all segments of the form conversion neural network 500 jointly to modify their respective parameters.

Consequently, with each iteration of training, the form conversion system 106 trains all segments of the form conversion neural network 500 jointly allowing for more efficient training. In particular, the form conversion system 106 gradually increases the accuracy of each segment of the form conversion neural network 500 (thereby increasing the accuracy of the form conversion neural network 500 as a whole) through gradient assent or gradient descent. Additionally, because each segment of the form conversion neural network 500 is jointly trained, having their losses taken into consideration collectively by the objective function 524, the form conversion system 106 improves the ability to effectively identify multiple element types.

Figure 5B:
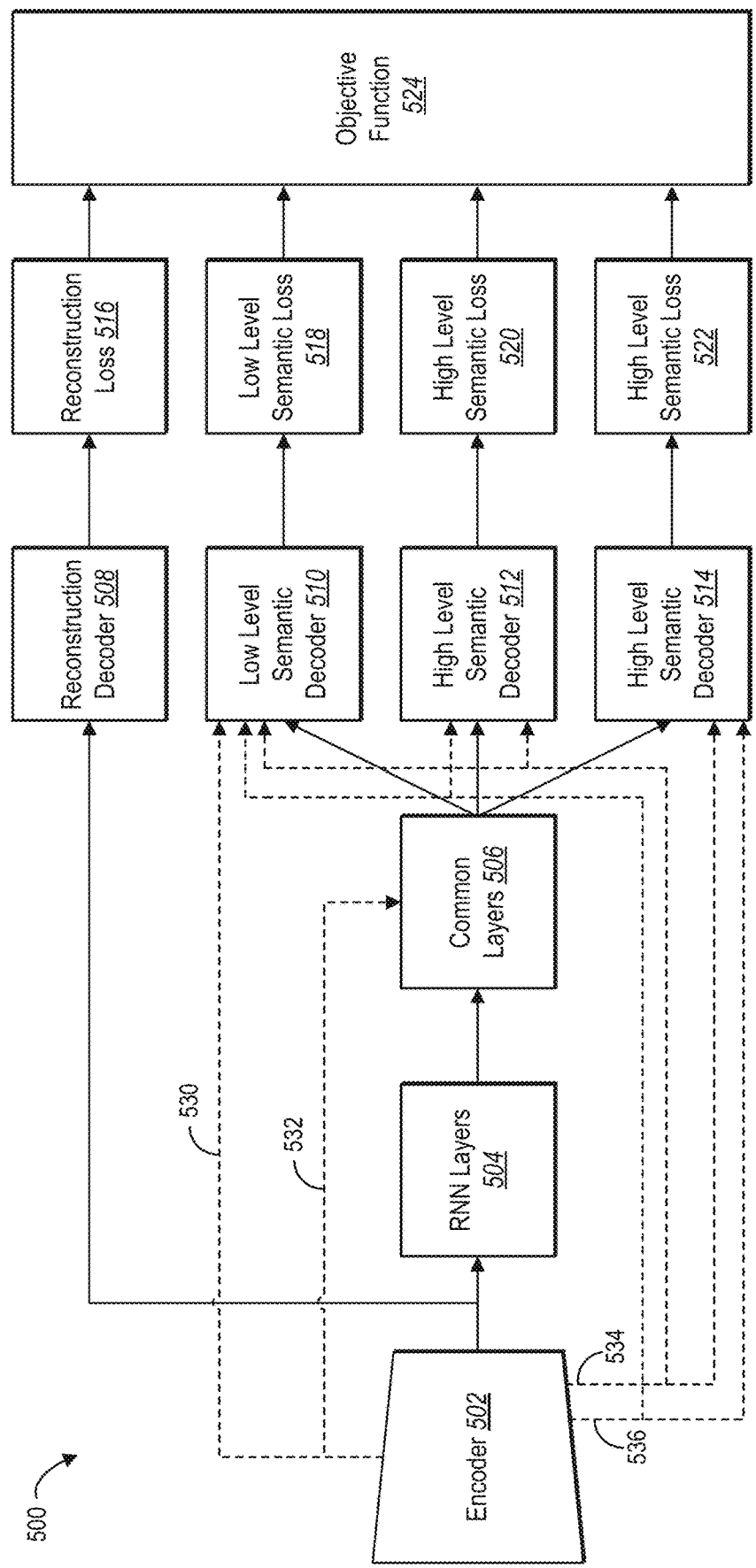

FIG. 5B also illustrates the form conversion system 106 training the form conversion neural network 500 to determine semantic characteristics and to generate a reconstructed layout of digitized paper forms. In particular, FIG. 5B illustrates the form conversion neural network 500 having the skip connections 530-536. For the purpose of simplicity, FIG. 5B illustrates the form conversion neural network 500 without the back propagation shown in FIG. 5A.

As briefly mentioned above with reference to FIG. 3, the encoder 502, the RNN layers 504, the common layers 506, the reconstruction decoder 508, the low-level semantic decoder 510, and the high-level semantic decoders 512-514 each include a plurality of neural network layers. In particular, each successive neural network layer processes the output of the previous layer (or the output of the previous neural network segment). As shown in FIG. 5B, the form conversion neural network 500 uses the skip connections 530-536 to route the output from a layer of the encoder 502 directly to a corresponding layer of the common layers 506, the low-level semantic decoder 510, and/or the high-level semantic decoders 512-514. Consequently, an encoder-layer-level feature map that is routed through one of the skip connections 530-536 avoids intervening processing, allowing for more precise determination of semantic characteristics of the digitized paper form by capturing lower level or more abstract features of the digitized paper form. Though FIG. 5B illustrates the form conversion neural network 500 having a particular configuration of skip connections, one having ordinary skill in the art will appreciate that the form conversion neural network 500 can be configured to use a greater or lesser number of skip connections or that the skip connections 530-536 can be used to route an output from any layer of the encoder 502 to any corresponding layer of any other segment of the form conversion neural network 500 (e.g., the RNN layers 504 or the reconstruction decoder 508).

Thus, the form conversion system 106 trains a form conversion neural network to determine the semantic characteristics of digitized paper forms and to generate semantic segmentation maps based on the determined semantic characteristics. Additionally, the form conversion system 106 trains the form conversion neural network to reconstruct the layout of digitized paper forms. The algorithms and acts described in reference to FIGS. 5A-5B can comprise the corresponding structure for performing a step for training a form conversion neural network to determine low-level semantic characteristics and high-level semantic characteristics of digitized paper forms by taking into account a plurality of losses from a plurality of decoder branches. In alternative embodiments, the neural networks described in relation to FIGS. 5A-5B can comprise the corresponding structure for performing a step for training a form conversion neural network to determine low-level semantic characteristics and high-level semantic characteristics of digitized paper forms by taking into account a plurality of losses from a plurality of decoder branches.

Figure 6:
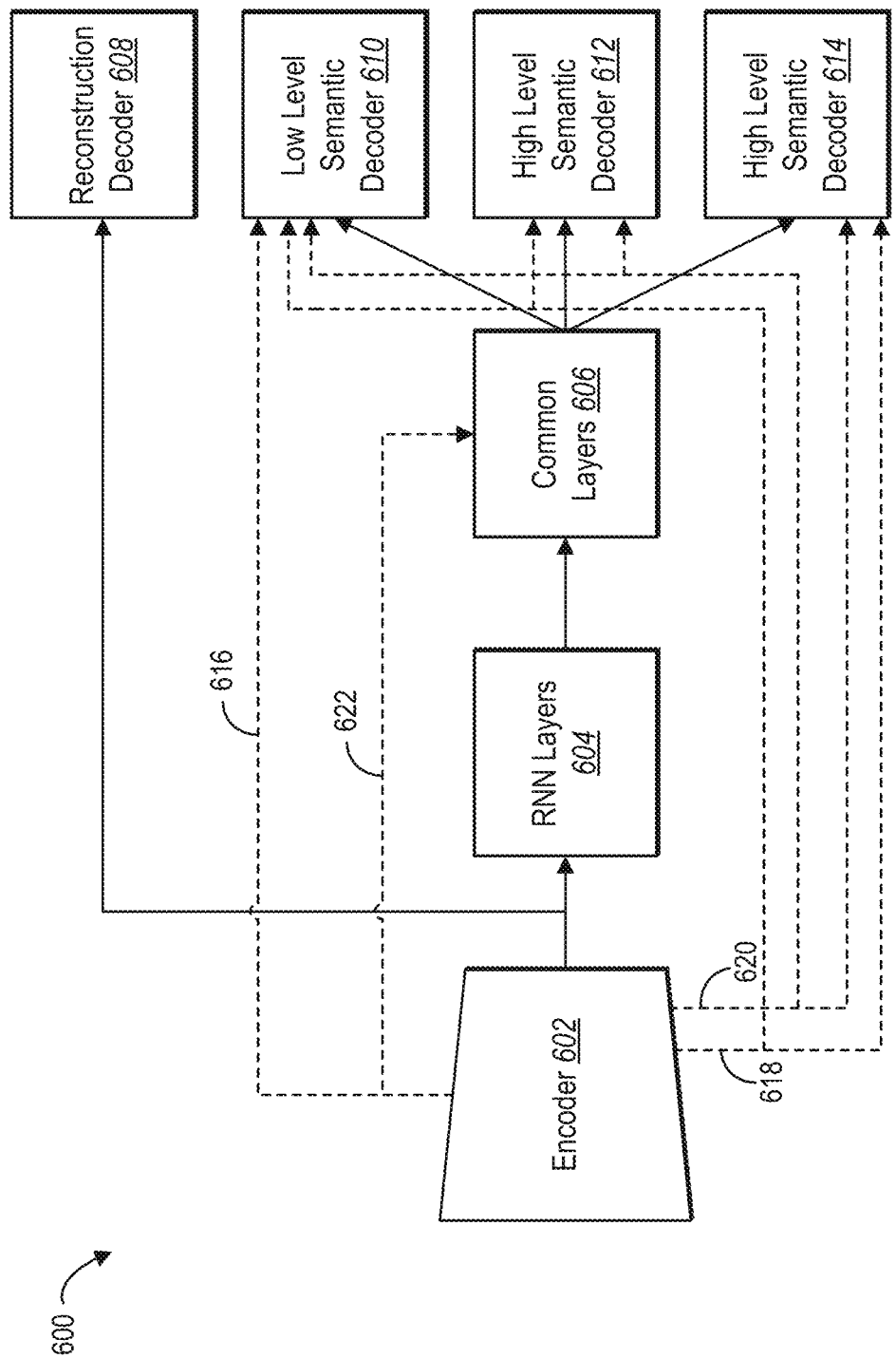
FIG. 6 illustrates a block schematic of a trained form conversion neural network for converting a digitized paper form into a fillable digital form in accordance with one or more embodiments.

FIG. 6 illustrates a trained form conversion neural network 600. In particular, the trained form conversion neural network 600 includes the encoder 602, the RNN layers 604, the common layers 606, the reconstruction decoder 608, the low-level semantic decoder 610, and the high-level semantic decoders 612-614. In general, the form conversion system 106 uses the trained form conversion neural network 600 to process a digitized paper form to reconstruct a layout and determine the semantic characteristics of the digitized paper form. As mentioned with reference to FIG. 4, determining the semantic characteristics of the digitized paper form allows the trained form conversion neural network 600 to generate several semantic segmentation maps that identify various element types within the digitized paper form. Using the reconstructed layout and the semantic segmentation maps, the form conversion system 106 can generate a Tillable digital form corresponding to the digitized paper form.

The form conversion system 106 uses the trained form conversion neural network 600 by supplying a digitized paper form to the encoder 602. In one or more embodiments, the digitized paper form is a grayscale, resized scanned form image of a physical document. In some embodiments, the digitized paper form maintains the aspect ratio of the original physical document. For example, the form conversion system 106 can resize a scanned form image to have the dimensions 792×792 while preserving the aspect ratio of the physical paper form.

After receiving the digitized paper form, the encoder 602 generates a feature map corresponding to the digitized paper form. In particular, and as mentioned previously, the encoder 602 includes a stack of successive neural network layers with the first layer processing the inputted digitized paper form and each successive layer processing the output of the layer before it. In one or more embodiments, the neural network layers of the encoder 602 are convolution layers. Specifically, the resulting feature map is of the generic dimensions H×W×C where C represents the number of channels and each channel could represent any number of latent features. In one or more embodiments, the neural network layers of the encoder 602 are as those presented in table 1.

TABLE 1

| Layer Type | Count of Layers | Kernel Size ($K_w \times K_h$) × Channels × Stride |
|---|---|---|
| Conv + BN + ReLu | 2 | 3 × 3 × 32 × 1 |
| Fork for skip connection 616 | | |
| Conv + BN + ReLu | 1 | 3 × 3 × 64 × 2 |
| Conv + BN + ReLu | 2 | 3 × 3 × 64 × 1 |
| Fork for skip connection 618 | | |
| maxPool | 1 | 3 × 3 × 64 × 2 |
| Conv + BN + ReLu | 2 | 3 × 3 × 96 × 1 |
| Fork for skip connection 620 | | |
| maxPool | 1 | 3 × 3 × 96 × 2 |
| Conv + BN + ReLu | 1 | 3 × 3 × 128 × 2 |
| Conv + BN + ReLu | 2 | 3 × 3 × 144 × 2 |
| Fork for skip connection 622 | | |
| maxPool | 1 | 3 × 3 × 144 × 2 |
| Conv + BN + ReLu | 2 | 3 × 3 × 196 × 2 |

The encoder 602 subsequently outputs the feature map to the reconstruction decoder 608 and the RNN layers 604. The reconstruction decoder 608 processes the feature map to generate a reconstructed layout of the digitized paper form, defining the boundaries of each semantic element within the digitized paper form. In particular, the reconstruction decoder 608 outputs a reconstructed layout of H×W×1 to mimic the input of the encoder 602. The reconstruction decoder 608 includes a stack of successive neural network layers with the first layer processing the feature map output by the encoder 602 and each successive layer processing the output of the layer before it. In one or more embodiments, the neural network layers of the reconstruction decoder 608 are as those presented below in table 2.

TABLE 1

| Layer Type | Count of Layers | Kernel Size ($K_w \times K_h$) × Channels × Stride |
|---|---|---|
| ConvTranspose | 1 | 5 × 5 × 144 × 2 |
| Conv + BN + ReLu | 1 | 1 × 1 × 128 × 1 |
| ConvTranspose | 1 | 3 × 3 × 96 × 2 |
| Conv + BN + ReLu | 1 | 1 × 1 × 64 × 1 |
| ConvTranspose | 1 | 3 × 3 × 32 × 2 |
| Conv + BN + ReLu | 1 | 1 × 1 × 16 × 1 |
| ConvTranspose | 1 | 3 × 3 × 8 × 2 |
| Conv + ReLu | 1 | 1 × 1 × 1 × 1 |

Concurrently, the RNN layers 604 also processes the feature map output by the encoder 602. In particular, the RNN layers 604 analyze the entire feature map outputted by the encoder 602 and generate a sequence of features. The RNN layers 604 include a stack of successive neural network layers with the first layer processing the feature map output of the encoder 602 and each successive layer processing the output of the neural network layer before it. In general, each neural network layer generates a map of dimension H×W×(2*S) where S is the state size of the layer. The RNN layers 604 will be discussed in more detail with reference to FIG. 7. However, in one or more embodiments, the neural network layers of the RNN layers 604 are as those presented below in table 3.

TABLE 2

| Layer Type | Count of Layers | State Size |
|---|---|---|
| BidirectionalVerticalRnn | 1 | 192 |
| BidirectionalHorzRnn | 1 | 192 |
| BidirectionalVerticalRnn | 1 | 256 |
| BidirectionalHorzRnn | 1 | 256 |
| BidirectionalVerticalRnn | 1 | 288 |
| BidirectionalHorzRnn | 1 | 288 |

The final map generated by the RNN layers 604 is then output to the common layers 606. In general, the common layers 606 includes a stack of successive neural network layers with the first layer processing the output of the RNN layers 604 and each successive layer processing the output of the layer before it. In one or more embodiments, as shown in FIG. 6 and Table 4, a layer of the common layers 606 receives an encoder-layer-level feature map directly from a layer of the encoder 602 via the skip connection 622. The receiving layer of the common layers 606 combines the encoder-level-layer feature map with a previous feature map of the immediately prior layer of the common layers 606. In one or more embodiments, the receiving layer of the common layers 606 combines the two feature maps by concatenating their channel dimensions. For example, if the encoder 602 routed an encoder-layer-level feature map having dimension 32×32×64 directly to a layer of the common layers 606 via the skip connection 622 and the immediately prior layer of the common layers 606 generated a feature map with dimensions 32×32×20, then the receiving layer of the common layers 606 can concatenate the two feature maps to generate a combined feature map with dimensions 32×32×84. In one or more embodiments, the neural network layers of the common layers 606 are as those presented below in table 4.

TABLE 3

| Layer Type | Count of Layers | Kernel Size ($K_w \times K_h$) × Channels × Stride |
|---|---|---|
| ConvTranspose | 1 | 5 × 5 × 196 × 2 |
| Conv + BN + ReLu | 1 | 1 × 1 × 144 × 1 |
| Concat skip connection 622 | 1 | |

The common layers 606 then outputs the generated feature map to the low-level semantic decoder 610 and the high-level semantic decoders 612-614. In particular, the low-level semantic decoder 610 processes the output of the common layers 606 to determine the low-level semantic characteristics of each pixel of the digitized paper form. After determining the low-level semantic characteristics of a pixel, the low-level semantic decoder 610 determines the low-level element type probabilities for that pixel (i.e., the probability that the pixel belongs to a low-level element type). Subsequently, the low-level semantic decoder 610 classifies the pixel as a low-level element type based on the probabilities. In one or more embodiments, the low-level semantic decoder 610 classifies the pixel as the element type having the highest probability for that pixel. When all pixels have been classified, the low-level semantic decoder 610 generates a low-level semantic map identifying each pixel as one of the low-level element types.

In general, the low-level semantic decoder 610 includes a stack of successive neural network layers with the first layer processing the output of the common layers 606 and each successive layer processing the output of the layer before it. In one or more embodiments, the neural network layers of the low-level semantic decoder 610 are deconvolution layers. In one or more embodiments, as shown in FIG. 6 and Table 5, a layer of the low-level semantic decoder 610 receives an encoder-layer-level feature map directly from a layer of the encoder 602 via the skip connection 616. Additional layers from the low-level semantic decoder 610 receive an encoder-layer-level feature map directly from corresponding layers of the encoder 602 via the skip connections 618-620. The recipient layers of the low-level semantic decoder 610 combine the encoder-level-layer feature map with a previous feature map output from the immediately prior layer of the low-level semantic decoder 610. In one or more embodiments, the low-level semantic decoder 610 combines the two feature maps by concatenating their channel dimensions. In one or more embodiments, the neural network layers of the low-level semantic decoder 610 are as those presented below in table 5.

TABLE 4

| Layer Type | Count of Layers | Kernel Size ($K_w \times K_h$) × Channels × Stride |
|---|---|---|
| ConvTranspose | 1 | 3 × 3 × 128 × 2 |
| Conv + BN + ReLu | 1 | 1 × 1 × 96 × 1 |
| Concat skip connection 620 | 1 | |
| ConvTranspose | 1 | 3 × 3 × 64 × 2 |
| Conv + BN + ReLu | 1 | 1 × 1 × 32 × 1 |
| Concat skip connection 618 | 1 | |
| ConvTranspose | 1 | 3 × 3 × 16 × 2 |

TABLE 4-continued

| Layer Type | Count of Layers | Kernel Size ($K_w \times K_h$) × Channels × Stride |
|---|---|---|
| Conv + BN + ReLu | 1 | 3 × 3 × 8 × 1 |
| Concat skip connection 616 | 1 | |
| Conv + BN + ReLu | 1 | 3 × 3 × 8 × 1 |
| Conv | 1 | 3 × 3 × Num_types × 1 |
| SoftMax | 1 | |

As can be seen in Table 5, the low-level semantic decoder 610 ends with a neural network layer employing a SoftMax classifier. In particular, the SoftMax classifier provides a predicted classification of a pixel based on the probabilities of the element type of that pixel.

The high-level semantic decoders 612-614 each process the output of the common layers 606 to determine the high-level semantic characteristics of each pixel of the digitized paper form. In particular, the trained form conversion neural network 600 can use each of the high-level semantic decoders 612-614 to identify a different level of semantics within a hierarchy of semantics. For example, the trained form conversion neural network 600 can use the high-level semantic decoder 612 to identify semantic characteristics associated with text blocks. Additionally, the trained form conversion neural network 600 can use the high-level semantic decoder 614 to identify semantic characteristics associated with fields.

After determining the high-level semantic characteristics of a pixel, the high-level semantic decoders 612-614 determine the high-level element type probabilities for that pixel. Subsequently, the high-level semantic decoders 612-614 classify the pixel as a given high-level element type based on the probabilities. In one or more embodiments, the high-level semantic decoders 612-614 classify the pixel as the element type having the highest probability for that pixel. When all pixels have been classified, each of the high-level semantic decoders 612-614 generates a high-level semantic map identifying each pixel as one of the high-level element types.

In general, the high-level semantic decoders 612-614 each include a stack of successive neural network layers with the first layer processing the output of the common layers 606 and each successive layer processing the output of the layer before it. In one or more embodiments, the neural network layers of the high-level semantic decoders 612-614 are deconvolution layers. In one or more embodiments, as shown in FIG. 6 and Table 6, one or more layers of the high-level semantic decoders 612-614 receives an encoder-layer-level feature map directly from a layer of the encoder 602 via each of the skip connections 618-620. The recipient layers of the high-level semantic decoders 612-614 combine the encoder-level-layer feature map with a previous feature map of the immediately prior layer of the respective high-level semantic decoder. In one or more embodiments, the high-level semantic decoders 612-614 combines the two feature maps by concatenating their channel dimensions. In one or more embodiments, the neural network layers of each of the high-level semantic decoders 612-614 are as those presented below in table 6.

TABLE 5

| Layer Type | Count of Layers | Kernel Size ($K_w \times K_h$) × Channels × Stride |
|---|---|---|
| ConvTranspose | 1 | 3 × 3 × 128 × 2 |
| Conv + BN + ReLu | 1 | 1 × 1 × 96 × 1 |
| Concat skip connection 620 | 1 | |
| ConvTranspose | 1 | 3 × 3 × 64 × 2 |

TABLE 5-continued

| Layer Type | Count of Layers | Kernel Size ($K_w \times K_h$) × Channels × Stride |
|---|---|---|
| Conv + BN + ReLu | 1 | 1 × 1 × 32 × 1 |
| Concat skip connection 618 | 1 | |
| ConvTranspose | 1 | 3 × 3 × 16 × 2 |
| Conv + BN + ReLu | 1 | 3 × 3 × 8 × 1 |
| Conv + BN + ReLu | 1 | 3 × 3 × 8 × 1 |
| Conv | 1 | 3 × 3 × Num_types × 1 |
| SoftMax | 1 | |

After the trained form conversion neural network 600 has processed the digitized paper form, the form conversion system 106 uses the generated reconstructed layout, low-level semantic segmentation map and high-level semantic segmentation map(s) to generate a fillable digital form. As discussed previously with reference to FIG. 4, the low-level and high-level semantic segmentation maps may include errors that result from the trained form conversion neural network 600 misclassifying pixel element types. As a result, the element boxes within the semantic segmentation maps are incomplete (e.g., can have jagged borders or have portions that are classified as a different element type. Therefore, one or more embodiments of the form conversion system 106 uses the reconstructed layout to verify and correct errors. For example, if one of the semantic segmentation maps includes an element box with a jagged border, the form conversion system 106 can use the corresponding layout box in the reconstructed layout to determine that some of the pixels have been misclassified. The form conversion system 106 can then reclassify the misclassified pixels based on the layout box provided in the reconstructed layout. For example, in one or more embodiments, the form conversion system 106 determines the classification of the majority of the pixels within the layout box and reclassifies the misclassified pixels in the element box to match.

Figure 7:
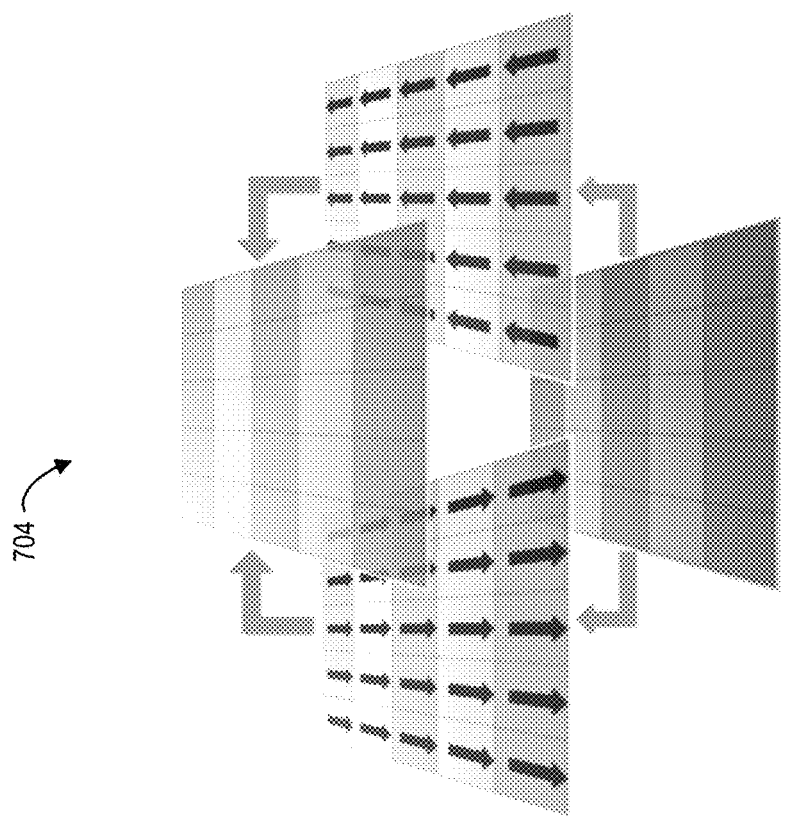
FIG. 7 illustrates RNN layers used in a form conversion neural network to process a digitized paper form in accordance with one or more embodiments.
Figure 7:
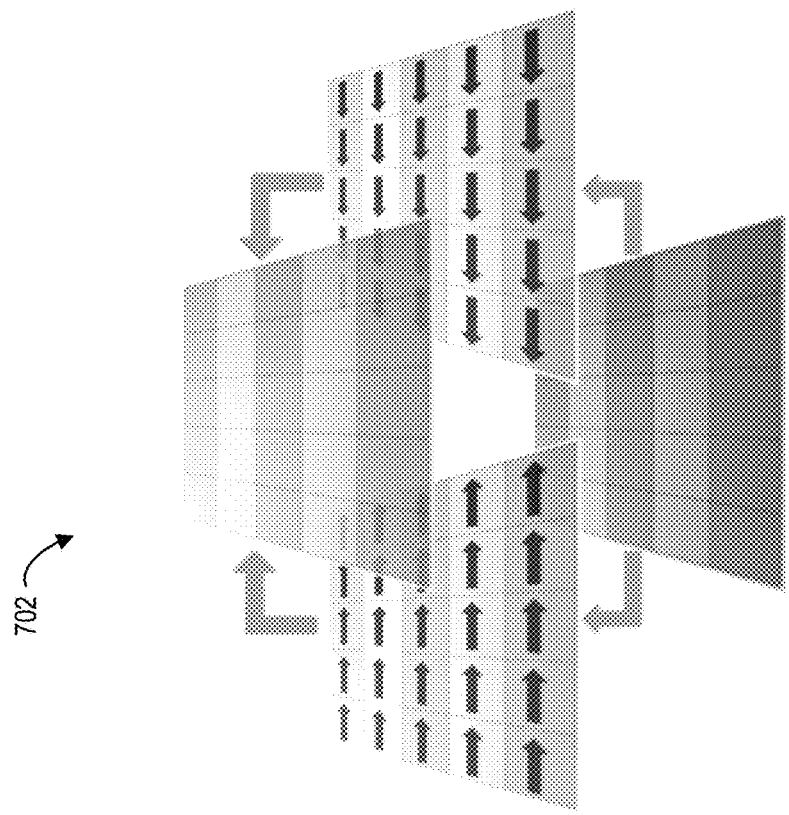

FIG. 7 illustrates the RNN layers used by the form conversion system 106 (i.e., the RNN layers 604 of the trained form conversion neural network 600). In one or more embodiments, the RNN segment is an intersection RNN cell. In particular, FIG. 7 illustrates the bidirectional horizontal RNN layers 702 and the bidirectional vertical RNN layers 704. The bidirectional horizontal RNN layers 702 work on the map having dimension H×W×C as generated by the previous neural network layer. In particular, the bidirectional horizontal RNN layers 702 have two RNN that run on all the rows of the feature map in reverse directions. The result is concatenated channel wise to generate a map of share H×W×(2*S) where S is the state size of each RNN. Similarly, the bidirectional vertical RNN layers 704 work on a map having dimension H×W×C as generated by the previous neural network layer. In particular, the bidirectional vertical RNN layers 704 have two RNN that run on all the columns in reverse directions. The result is concatenated channel wise to generate a map of share H×W×(2*S) where S is the state size of each RNN.

Thus, the form conversion system 106 can use a trained form conversion neural network including the components discussed in FIG. 6 and FIG. 7 to determine the semantic characteristics of a digitized paper form and to generate semantic segmentation maps based on the determined semantic characteristics. Additionally, the form conversion system can use the trained form conversion neural network to reconstruct a layout of the digitized paper form. The algorithms and acts described in reference to FIGS. 6 and 7 can comprise the corresponding structure for performing a step for determining low-level semantic characteristics and high-level semantic characteristics of a digitized paper form using a trained form conversion neural network. In alternative embodiments, the neural networks described in relation to FIGS. 6 and 7 can comprise the corresponding structure for performing a step for determining low-level semantic characteristics and high-level semantic characteristics of a digitized paper form using a trained form conversion neural network.

FIG. 8 illustrates an example digitized paper form 800 that the form conversion system 106 can use to generate a corresponding fillable digital form. In one or more embodiments, the digitized paper form 800 is a grayscale scanned image of a physical document. In some embodiments, the form conversion system 106 resizes the scanned image while preserving the aspect ratio of the physical document. As shown in FIG. 8, the digitized paper form 800 includes a variety of semantic elements. For example, the digitized paper form 800 includes the image 802, the text run 804, the widget 806 and the additional text runs 808-812. The form conversion system 106 inputs the digitized paper form 800 into a trained form conversion neural network (e.g., the trained form conversion neural network 600 of FIG. 6) to generate corresponding semantic segmentation maps and a corresponding reconstruction layout.

Figure 9:
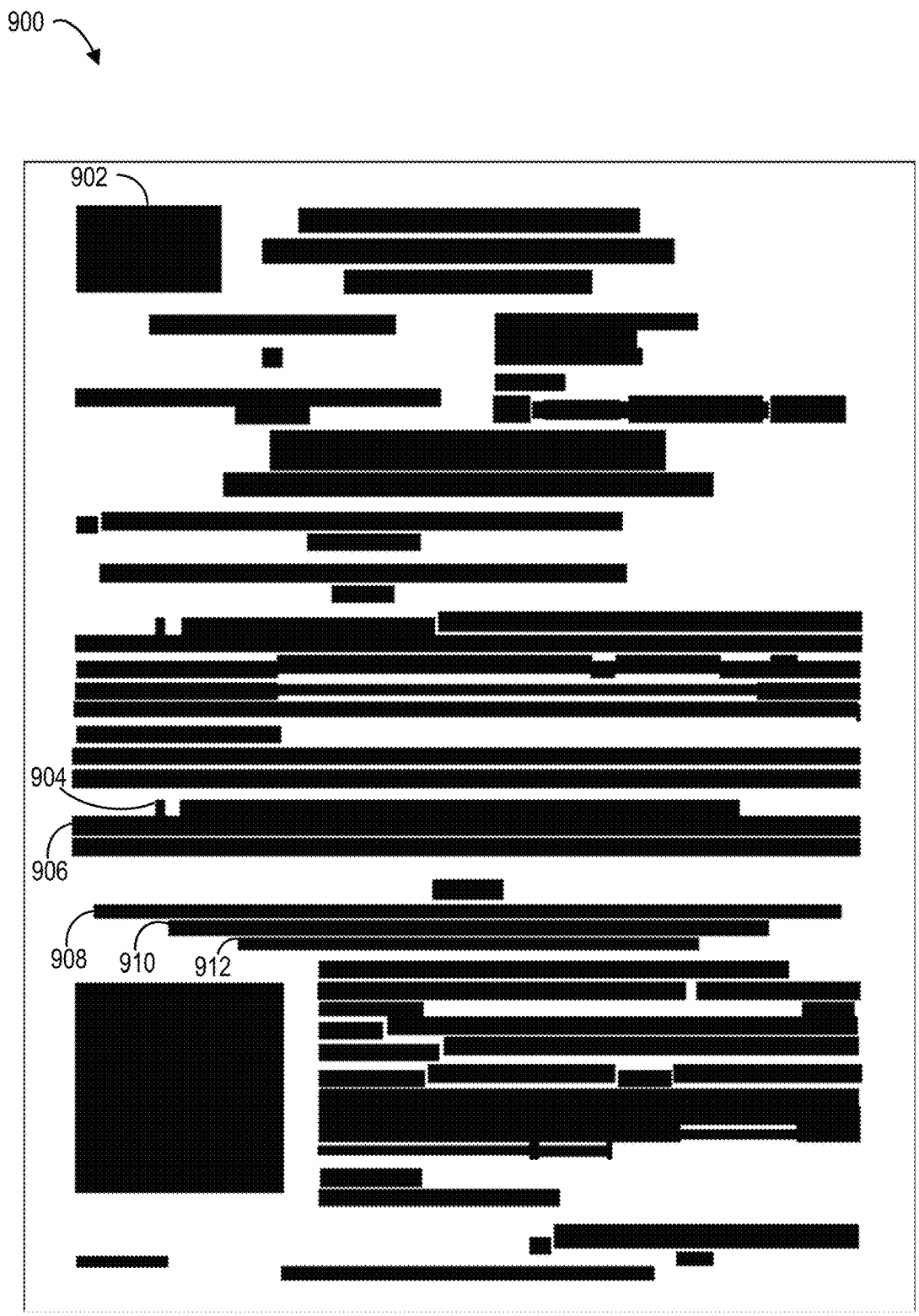
FIG. 9 illustrates a reconstructed layout of a digitized paper in accordance with one or more embodiments.

FIG. 9 illustrates the reconstructed layout 900 corresponding to the digitized paper form 800 of FIG. 8 as generated by the trained form conversion neural network of the form conversion system 106. In particular, the form conversion system 106 uses the reconstruction decoder of the trained form conversion neural network to generate the reconstructed layout 900. As can be seen by FIG. 9, the reconstructed layout 900 includes several layout boxes— each layout box corresponding to each of the semantic elements included within the digitized paper form 800. For example, the layout box 902 corresponds to the image 802 of the digitized paper form 800. Additionally, the layout box 904 corresponds to the text run 804; the layout box 906 corresponds to the widget 806; and the layout boxes 908-912 each correspond to the text runs 808-812 respectively.

As can be seen in FIG. 9, the reconstructed layout 900 does not provide a distinction between the layout boxes other than size. In other words, the reconstructed layout 900 does not provide an indication of the element type to which each pixel of the digitized paper form 800 belongs. Rather, the reconstructed layout 900 defines the boundaries of each semantic element of the digitized paper form 800 regardless of the element type. Therefore, a particular layout box indicates that—whatever element type is confined within the box—pixels belonging to that element type do not extend beyond the layout box and every pixel falling within that layout box belongs to the same semantic element and are of the same element type.

Figure 10:
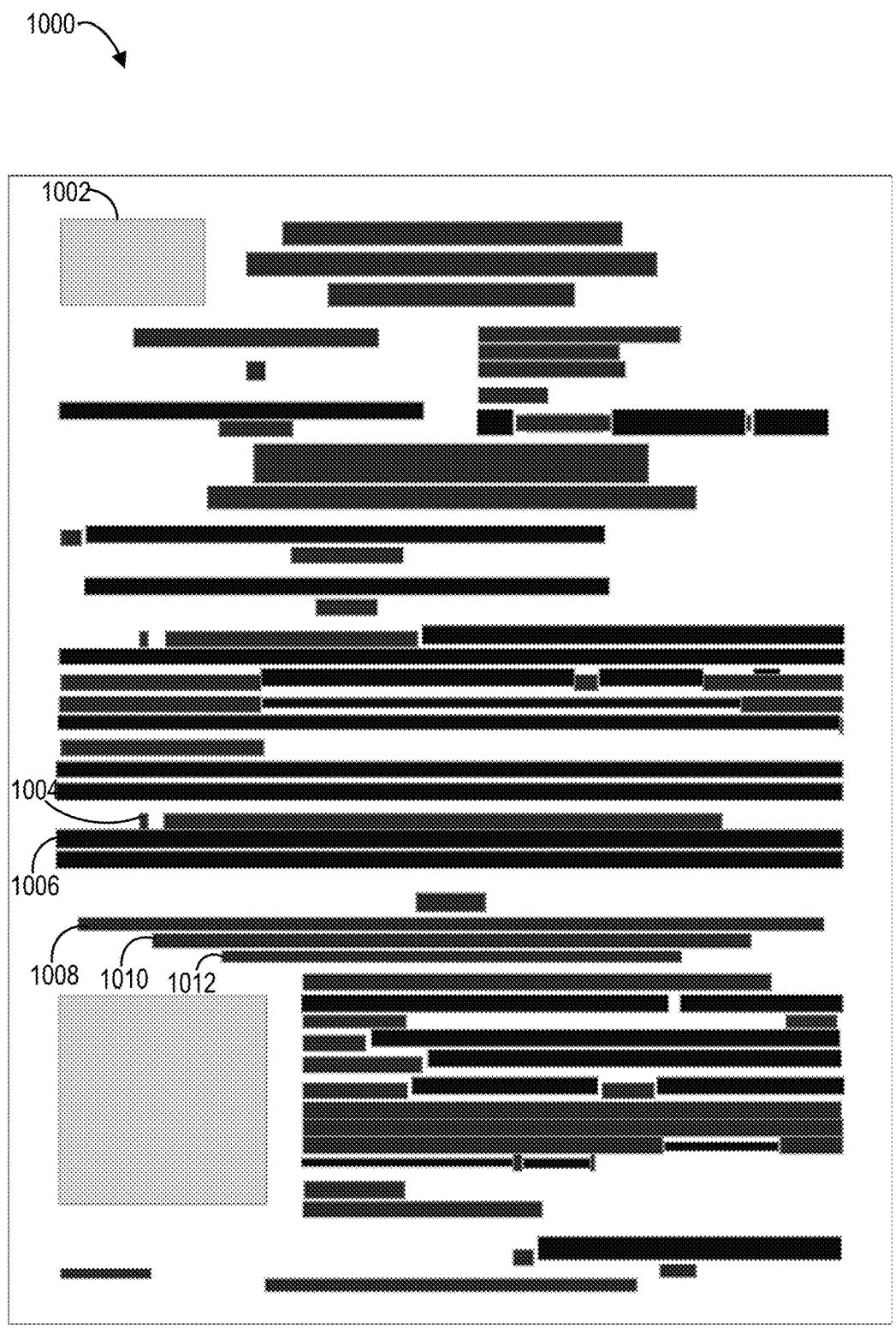
FIG. 10 illustrates a low-level semantic segmentation map of a digitized paper form in accordance with one or more embodiments.

FIG. 10 illustrates the low-level semantic segmentation map 1000 corresponding to the digitized paper form 800 as generated by the trained form conversion neural network of the form conversion system 106. In particular, the form conversion system 106 uses the low-level semantic decoder of the trained form conversion neural network to generate the low-level semantic segmentation map 1000. As seen in FIG. 10, the low-level semantic segmentation map 1000 contains several low-level element boxes, each of which identifies a low-level element type included within the digitized paper form 800. For example, the low-level semantic segmentation map 1000 includes the image box 1002 corresponding to the image 802 of the digitized paper form 800. Additionally, the text run box 1004 corresponds to the text run 804; the widget box 1006 corresponds to the widget 806; and the additional text run boxes 1008-1012 correspond to the text runs 808-812 respectively. Additionally, each low-level element box is bounded by pixels classified as a border element type. In one or more embodiments, the borders of the element type boxes can be jagged due to misclassification of pixels and the form conversion system 106 uses the reconstructed layout 900 to correct this error.

Figure 11:
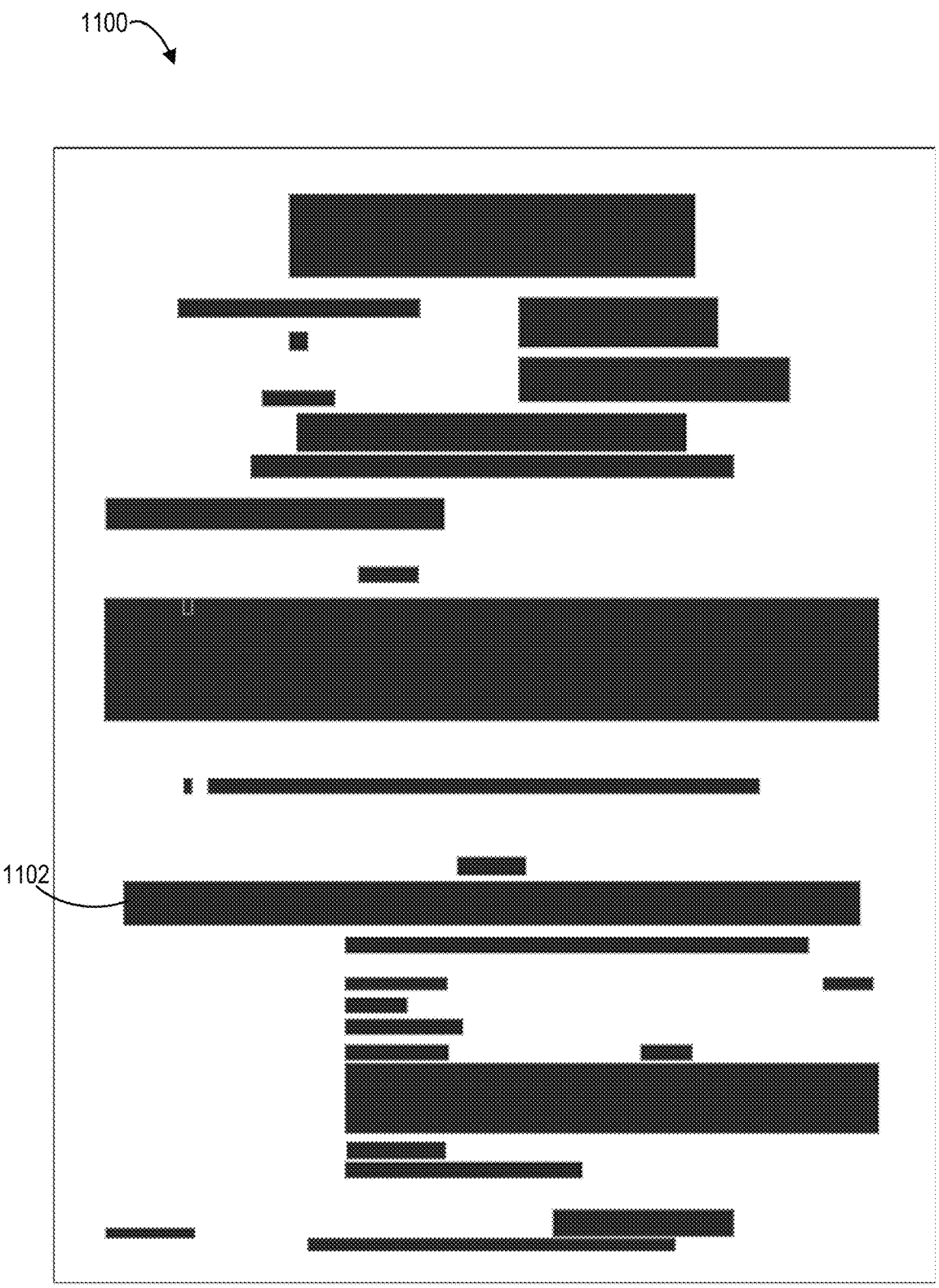
FIG. 11 illustrates a text block map of a digitized paper form in accordance with one or more embodiments.

FIG. 11 illustrates a text block map 1100 corresponding to the digitized paper form 800 as generated by the trained form conversion neural network of the form conversion system 106. In particular, the text block map 1100 is a high-level semantic segmentation map generated by a high-level semantic decoder of the trained form conversion neural network. As seen in FIG. 11, the text block map 1100 contains several text block boxes, each of which identifies an individual text block included within the digitized paper form 800. As mentioned, a text block includes multiple text runs. For example, the text block 1102 is made of the text runs 808-812 of the digitized paper form 800. In one or more embodiments, the borders of the text block boxes can be jagged due to misclassification of pixels and the form conversion system 106 uses the reconstructed layout 900 to correct this error.

Figure 12:
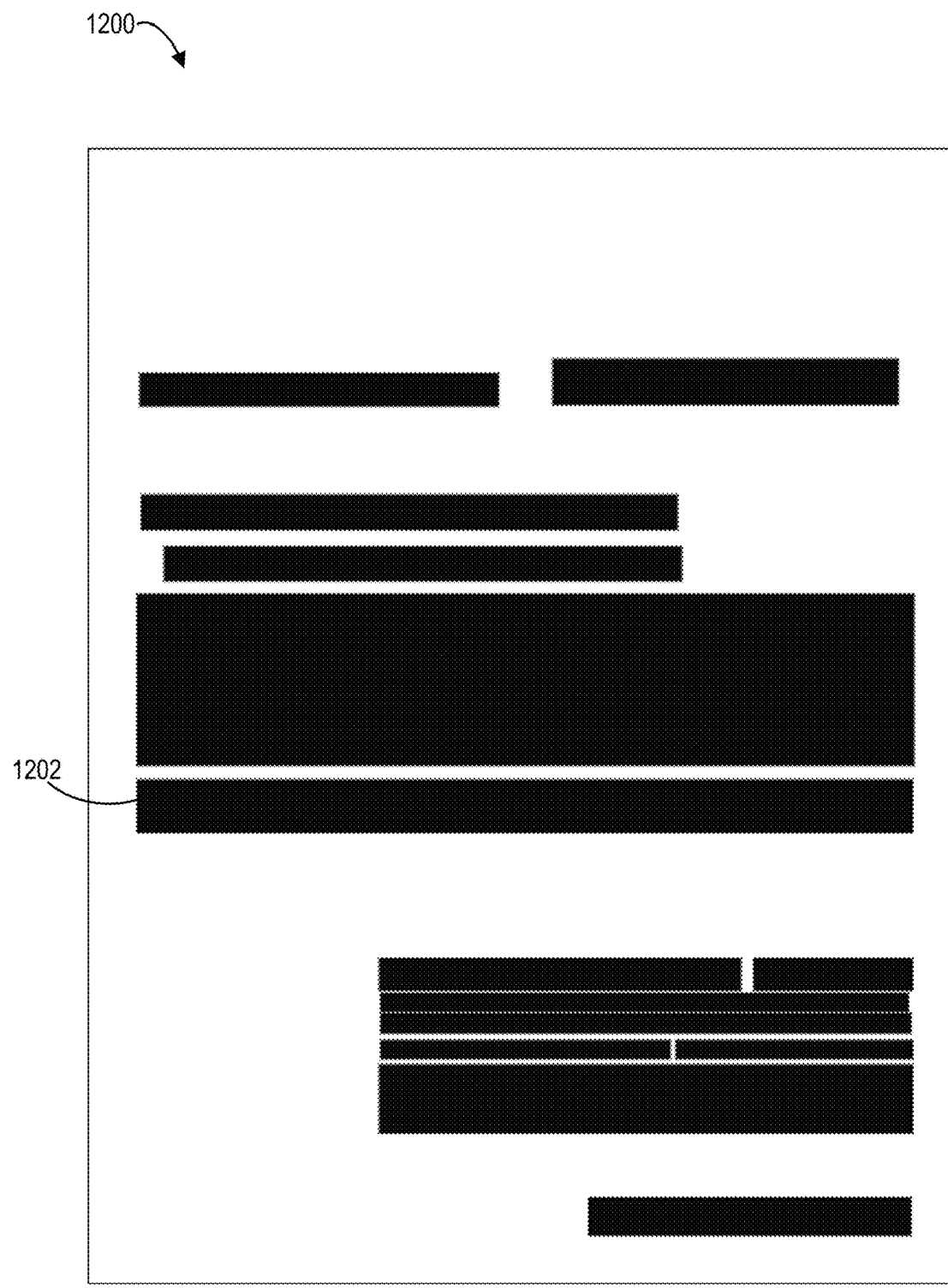
FIG. 12 illustrates a field map of a digitized paper form in accordance with one or more embodiments.

FIG. 12 illustrates a field map 1200 corresponding to the digitized paper form 800 as generated by the trained form conversion neural network of the form conversion system 106. In particular, the field map 1200 is a high-level semantic segmentation map generated by a high-level semantic decoder of the trained form conversion neural network. As seen in FIG. 12, the field map 1200 contains several field boxes, each of which identifies an individual field included within the digitized paper form 800. As mentioned, a field can be made of a text block and a widget. For example, the field 1202 corresponds to the combination of text runs and widgets, including the text run 804 and the widget 806, of the digitized paper form 800. In one or more embodiments, the borders of the field boxes can be jagged due to misclassification of pixels and the form conversion system 106 uses the reconstructed layout 900 to correct this error.

Figure 13:
FIG. 13 illustrates a fillable digital form corresponding to a digitized paper form in accordance with one or more embodiments.

As mentioned, the form conversion system 106 uses the reconstructed layout, the low-level semantic segmentation map, and the high-level semantic segmentation maps to generate a fillable digital form corresponding to a digitized paper form. FIG. 13 illustrates a fillable digital form 1300 corresponding to the digitized paper form 800. As shown, the fillable digital form 1300 recreates the digitized paper form 800. In particular, the fillable digital form includes each of the semantic elements of the digitized paper form 800 but converts each of the widgets into fillable elements. For example, the fillable digital form 1300 includes the fillable widget 1302 corresponding to the widget 806 of the digitized paper form 800. In one or more embodiments, the fillable digital form 1300 can contain additional fillable elements. For example, the fillable digital form 1300 can additionally include boxes that can be checked or items that can be highlighted or circled to indicate a selection of the user. Thus, the form conversion system 106 creates a digital form containing elements with which a user can interact using an electronic device.

Figure 14:
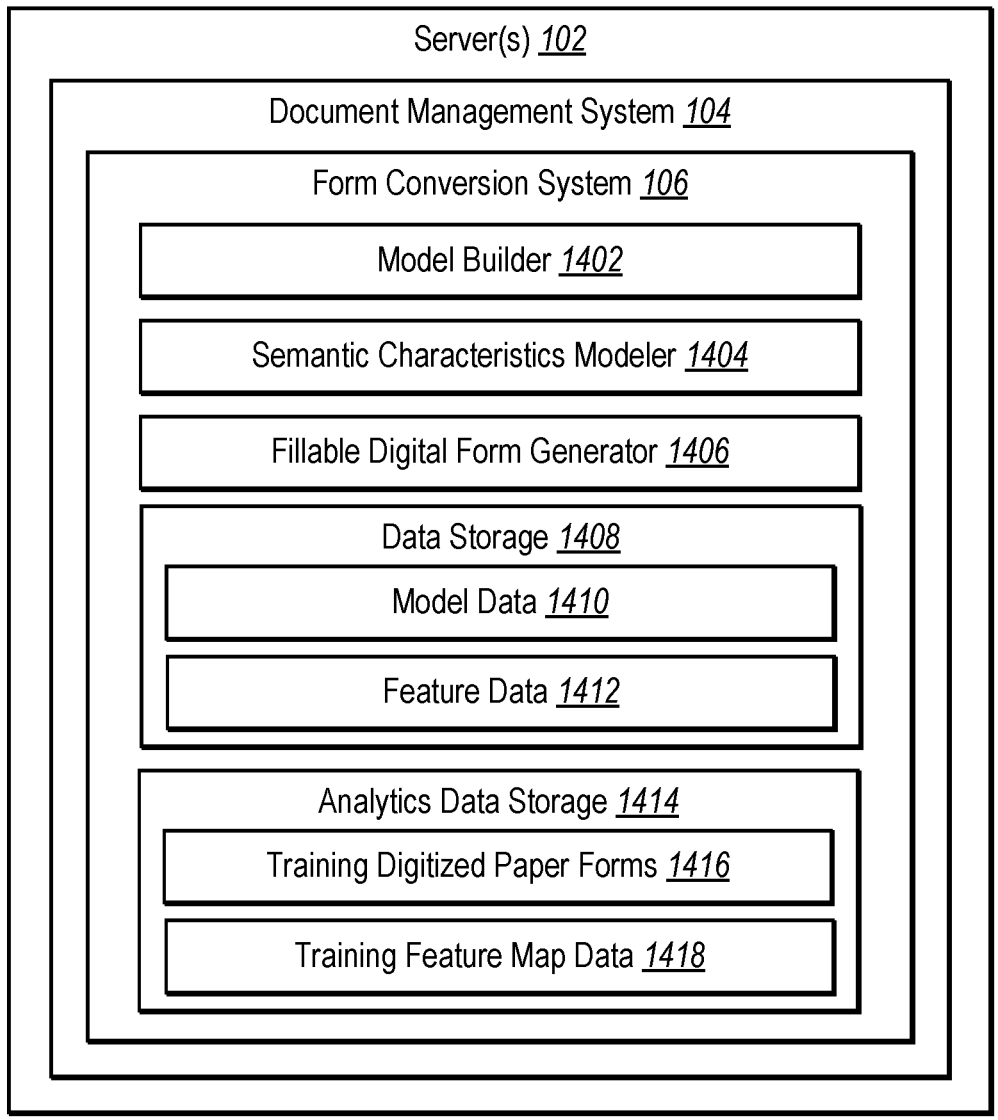
FIG. 14 illustrates an example schematic diagram of a form conversion system in accordance with one or more embodiments.

FIG. 14 illustrates a detailed schematic diagram of an example architecture of the form conversion system 106. As shown, the form conversion system 106 can be part of the server(s) 102 and the document management system 104. Additionally, the form conversion system 106 can include, but is not limited to, a model builder 1402, a semantic characteristics modeler 1404, a Tillable digital form generator 1406, data storage 1408, and analytics data storage 1414.

In one or more embodiments, each of the components of the form conversion system 106 are in communication with one another using any suitable communication technologies. Additionally, the components of the form conversion system 106 can be in communication with one or more other devices including a client device of a user. It will be recognized that although the components of the form conversion system 106 are shown to be separate in FIG. 14, any of the components may be combined into fewer components, such as a single component, or divided into more components as may serve a particular implementation. Furthermore, although the components of FIG. 14 are described in connection with the form conversion system 106, at least some components for performing operations in conjunction with the form conversion system 106 described herein may be implemented on other devices within the environment.

The components of the form conversion system 106 can include software, hardware, or both. For example, the components of the form conversion system 106 can include one or more instructions stored on a non-transitory computer readable storage medium and executable by processors of one or more computing devices or, alternatively, by servers (e.g., the server(s) 102) of a system. When executed by the one or more processors or servers, the computer-executable instructions of the form conversion system 106 can cause the computing device or system to perform the training and estimation functions described herein. Alternatively, the components of the form conversion system 106 can comprise hardware, such as a special purpose processing device to perform a certain function or group of functions. Additionally, or alternatively, the components of the form conversion system 106 can include a combination of computer-executable instructions and hardware.

Furthermore, the components of the form conversion system 106 performing the functions described herein with respect to the form conversion system 106 may, for example, be implemented as part of a stand-alone application, as a module of an application, as a plug-in for applications including electronic messaging applications, as a library function or functions that may be called by other applications, and/or as a cloud-computing model. Thus, the components of the form conversion system 106 may be implemented as part of a stand-alone application on a personal computing device or a mobile device. Alternatively, or additionally, the components of the form conversion system 106 may be implemented in any application that allows creation and storage of digital content.

As mentioned, the form conversion system 106 can include the model builder 1402 to train a form conversion neural network to determine semantic characteristics and reconstruct a layout of a digitized paper form. Additionally, the model builder 1402 can train the form conversion neural network to generate semantic segmentation maps based on the determined semantic characteristics of the digitized paper form. For example, in one or more embodiments, the model builder 1402 trains the form conversion neural network using training digitized paper forms and training feature maps. With every iteration of training, the model builder 1402 modifies the parameters of each component of the form conversion neural network to increase its accuracy. In particular, the model builder 1402 determines the loss of the reconstruction decoder and the semantic segmentation decoders, combines the losses, determines how to minimize the combined losses, and back propagates the combined losses to the form conversion neural network components to modify their parameters accordingly.

As shown in FIG. 14, the form conversion system 106 also includes the semantic characteristics modeler 1404. In particular, the semantic characteristics modeler 1404 uses the form conversion neural network trained by the model builder 1402. For example, the semantic characteristics modeler 1404 applies a digitized paper form to a trained form conversion neural network to determine the semantic characteristics of the digitized paper form. In particular, the semantic characteristics modeler 1404 uses the form conversion neural network to determine the low-level and high-level semantic characteristics of the digitized paper form and generate corresponding low-level and high-level semantic segmentation maps. Additionally, the semantic characteristics modeler 1404 uses the form conversion neural network to reconstruct a layout of the digitized paper form.

Additionally, as shown in FIG. 14, the form conversion system 106 includes the fillable digital form generator 1406. In particular, the fillable digital form generator 1406 uses the low-level and high-level semantic segmentation maps and the reconstructed layout generated by the semantic characteristics modeler 1404 to generate a fillable digital form corresponding to the digitized paper form. In one or more embodiments, the fillable digital form generator 1406 uses the reconstructed layout to correct errors within the semantic segmentation maps due to misclassification of pixels.

As shown in FIG. 14, the form conversion system 106 also includes data storage 1408. In particular, data storage 1408 includes model data 1410 and feature data 1412. The model data 1410 stores the form conversion neural network trained by the model builder 1402 to determine semantic characteristics and reconstruct a layout of a digitized paper form. In particular, the model data 1410 stores the architecture of the form conversion neural network, including the organization of the encoders and decoders and the neural network layers included within each component. Additionally, the feature data 1412 stores the parameter values for each component of the form conversion neural network as determined by the model builder 1402 when training the form conversion neural network.

Additionally, as shown in FIG. 14, the form conversion system 106 includes analytics data storage 1414. In particular, analytics data storage 1414 includes training digitized paper forms 1416 and training feature map data 1418. The training digitized paper forms 1416 include digitized paper forms used by the model builder 1402 for training the form conversion neural network. Similarly, the training feature map data 1418 includes semantic segmentation maps and reconstructed layouts used for training the form conversion neural network. In particular, the training feature map data 1418 includes low-level and high-level semantic segmentation maps and reconstructed layouts corresponding to the training digitized paper forms 1416. The model builder 1402 uses these semantic segmentation maps and reconstructed layouts as ground truths when determining the loss of each of the neural network decoders.

Figure 15:
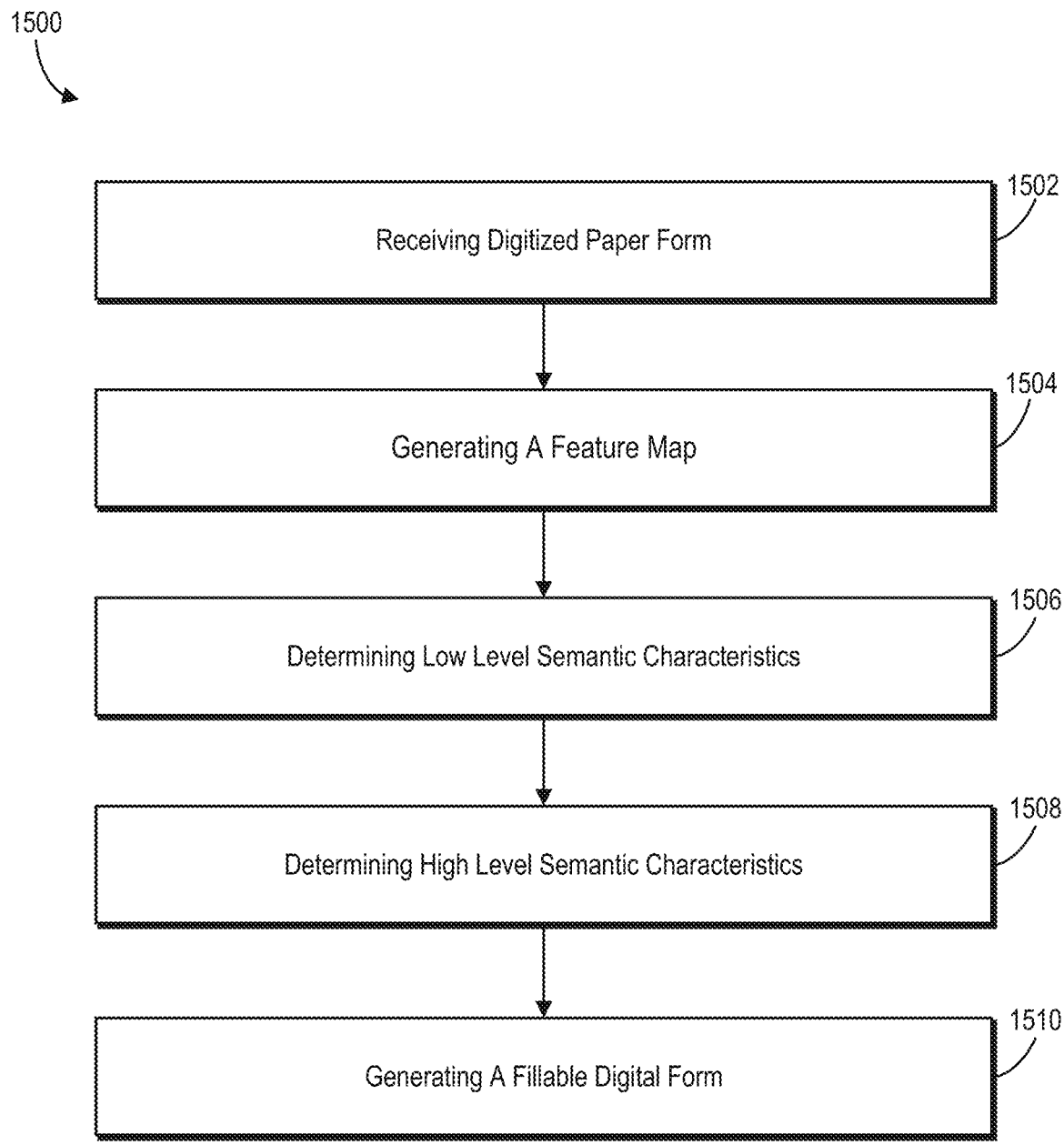
FIG. 15 illustrates a flowchart of a series of acts for generating a fillable digital form in accordance with one or more embodiments.

Turning now to FIG. 15, this figure illustrates a series of acts 1500 for generating a Tillable digital form. While FIG. 15 illustrates acts according to one embodiments, alternative embodiments may omit, add to, reorder, and/or modify any of the acts shown in FIG. 15. The acts of FIG. 15 can be performed as part of a method. In one or more embodiments, a non-transitory computer readable storage medium can comprise instructions that, when executed by one or more processors, cause a computing device to perform the acts of FIG. 15. In still further embodiments, a system can perform the acts of FIG. 15.

The series of acts 1500 includes an act 1502 of receiving a digitized paper form. For example, act 1502 involves receiving a digitized paper form comprising a plurality of pixels. In one or more embodiments, the digitized paper form is a grayscale, resized scanned form image of a physical document. In some embodiments, the digitized paper form maintains the aspect ratio of the original physical document.

The series of acts 1500 also includes an act 1504 of generating a feature map. For example, act 1504 involves using a form conversion neural network trained to determine semantic structures of digitized paper forms by generating a feature map by processing the digitized paper form comprising the plurality of pixels using a neural network encoder. In one or more embodiments, the trained form conversion neural network includes a neural network encoder that outputs feature maps to a form conversion neural network reconstruction decoder, a neural network low-level semantic decoder, and one or more neural network high-level semantic decoders. In some embodiments, the neural network encoder outputs the feature maps to the semantic decoders through a common semantic segmentation trunk comprising RNN layers and common layers.

For example, in one or more embodiments, the neural network encoder outputs the feature map to the common semantic segmentation trunk. The form conversion neural network then generates a common trunk feature map by processing the feature map using the form conversion neural network common semantic segmentation trunk. In one or more embodiments, the form conversion neural network uses a skip connection between the neural network encoder and the form conversion neural network common semantic segmentation trunk when processing the feature map. In particular, the form conversion neural network passes an encoder-layer-level feature map from a layer of the neural network encoder directly to a corresponding layer of the form conversion neural network common semantic segmentation trunk using the skip connection. The form conversion neural network common semantic segmentation trunk then combines the encoder-layer-level feature map with a previous feature map of a previous layer of the form conversion neural network common semantic segmentation trunk. In one or more embodiments, combining the encoder-layer-level feature map with the previous feature map comprises concatenating the encoder-layer-level feature map with the previous feature map.

The series of acts 1500 also includes an act 1506 of determining low-level semantic characteristics. For example, act 1506 involves using the form conversion neural network trained to determine semantic structures of digitized paper forms by determining one or more low-level semantic characteristics for the plurality of pixels by processing the feature map using a neural network low-level semantic decoder. In one or more embodiments, the feature map is first processed by the form conversion neural network common semantic segmentation trunk and the neural network low-level semantic decoder then processes the resulting common trunk feature map. In one or more embodiments, the low-level semantic characteristics indicates one or more of a text run, a widget, an image, or an element border. In other words, the low-level semantic characteristics can contribute to a probability that a pixel belongs to one or more of the low-level element types.

In one or more embodiments, the form conversion neural network uses a skip connection between the neural network encoder and the neural network low-level semantic decoder when determining the low-level semantic characteristics. In particular, the form conversion neural network passes an encoder-layer-level feature map from a layer of the neural network encoder directly to a corresponding layer of the neural network low-level semantic decoder using the skip connection. The neural network low-level semantic decoder then combines the encoder-layer-level feature map with a previous feature map of a previous layer of the neural network low-level semantic decoder.

Additionally, in one or more embodiments, the neural network low-level semantic decoder further generates a low-level semantic segmentation map based on the determined one or more low-level semantic characteristics for the plurality of pixels. In particular, the low-level semantic decoder uses the determined low-level semantic characteristics of a pixel to determine probabilities concerning the element type to which that pixel belongs. Based on the determined probabilities, the neural network low-level semantic decoder can classify the pixel as a low-level element type. In one or more embodiments, the neural network low-level semantic decoder classifies the pixel as the element type corresponding to the highest probability. The neural network low-level semantic decoder then generates the low-level semantic segmentation map based on the low-level element classification of each pixel.

Additionally, the series of acts 1500 includes an act 1508 of determining high-level semantic characteristics. For example, act 1508 involves using the form conversion neural network trained to determine semantic structures of digitized paper forms by determining one or more high-level semantic characteristics for the plurality of pixels by processing the feature map using one or more neural network high-level semantic decoders. In one or more embodiments, the feature map is first processed by the form conversion neural network common semantic segmentation trunk and the neural network high-level semantic decoders then process the resulting common trunk feature map. In one or more embodiments, the high-level semantic characteristics indicate one or more of a text block, a field, a list, or a table. In other words, the high-level semantic characteristics can contribute to a probability that a pixel belongs to one or more of the high-level element types.

In one or more embodiments, the form conversion neural network uses a skip connection between the neural network encoder and the one or more neural network high-level semantic decoders when determining the high-level semantic characteristics. In particular, the form conversion neural network passes an encoder-layer-level feature map from a layer of the neural network encoder directly to a corresponding layer of each of the one or more neural network high-level semantic decoders using the skip connection. The neural network high-level semantic decoders then combine the encoder-layer-level feature map with a previous feature map of a previous layer of the neural network low-level semantic decoder.

In one or more embodiments, the one or more neural network high-level semantic decoders further generate one or more high-level semantic segmentation maps based on the determined one or more high-level semantic characteristics for the plurality of pixels. In particular, each neural network high-level semantic decoder uses its respectively determined high-level semantic characteristics for each pixel to determine probabilities concerning the element type to which that pixel belongs. Based on the determined probabilities, each high-level semantic decoder can classify the pixel as a high-level element type pertaining to that decoder. In one or more embodiments, the neural network high-level semantic decoders classify each pixel as the element type corresponding to the highest probability. Each neural network high-level semantic decoder then generates a high-level semantic segmentation map based on the high-level element classification of each pixel.

The series of acts 1500 also includes an act 1510 of generating a fillable digital form. For example, act 1510 involves generating a fillable digital form based on the determined one or more low-level semantic characteristics and the determined one or more high-level semantic characteristics. In one or more embodiments, the form conversion neural network further generates a reconstructed layout corresponding to the digitized paper form using a trained form conversion neural network reconstruction decoder. Accordingly, generating the Tillable digital form is further based on the reconstructed layout. For example, in one or more embodiments, the form conversion system 106 combines the low-level semantic segmentation map, the one or more high-level semantic segmentation maps, and the reconstructed layout.

In one or more embodiments, the series of acts 1500 further includes acts for training a form conversion neural network to determine low-level semantic characteristics and high-level semantic characteristics of digitized paper forms by taking into account a plurality of losses from a plurality of decoder branches. For example, in one or more embodiments, the form conversion system 106 accesses analytics training data associated with a plurality of pixels of training digitized paper forms. The form conversion neural network of the form conversion system 106 then generates a training feature map by processing the training digitized paper form using the neural network encoder. Subsequently, the form conversion neural network processes the training feature map using the neural network low-level semantic decoder and compares a low-level output to a low-level ground truth to determine a low-level loss. Concurrently, the form conversion neural network processes the training feature map using the one or more neural network high-level semantic decoders and compares one or more high-level outputs to a corresponding high-level ground truth to determine one or more high-level losses. In one or more embodiments, the low-level output comprises a low-level semantic segmentation map and the one or more high-level outputs comprise one or more high-level semantic segmentation maps. The form conversion neural network then generates a combined loss comprising the low-level loss and the one or more high-level losses. The form conversion neural network then back propagates the combined loss to modify parameters of the neural network low-level semantic decoder, the one or more neural network high-level semantic decoders, and the neural network encoder.

In one or more embodiments, the form conversion neural network further processes the training feature map using the neural network reconstruction decoder and compares a reconstruction output to a reconstruction ground truth to determine a reconstruction loss. In particular, the combined loss further includes the reconstruction loss. Additionally, the form conversion neural network back propagates the combined loss to further modify parameters of the reconstruction decoder.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 16:
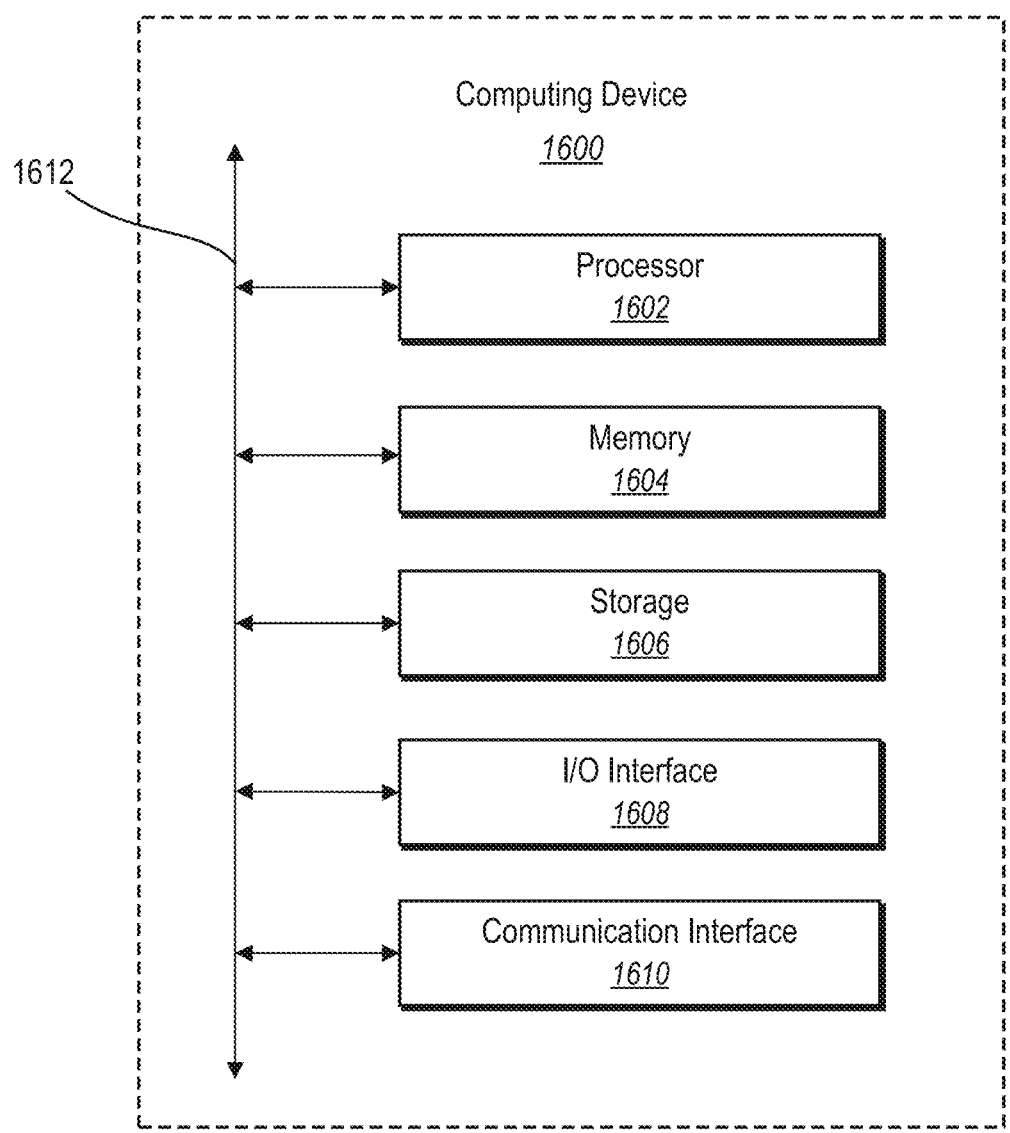
FIG. 16 illustrates a block diagram of an exemplary computing device in accordance with one or more embodiments.

FIG. 16 illustrates a block diagram of exemplary computing device 1600 that may be configured to perform one or more of the processes described above. One will appreciate that server(s) 102 and/or client devices 110a-110n may comprise one or more computing devices such as computing device 1600. As shown by FIG. 16, computing device 1600 can comprise processor 1602, memory 1604, storage device 1606, I/O interface 1608, and communication interface 1610, which may be communicatively coupled by way of communication infrastructure 1612. While an exemplary computing device 1600 is shown in FIG. 16, the components illustrated in FIG. 16 are not intended to be limiting. Additional or alternative components may be used in other embodiments. Furthermore, in certain embodiments, computing device 1600 can include fewer components than those shown in FIG. 16. Components of computing device 1600 shown in FIG. 16 will now be described in additional detail.

In particular embodiments, processor 1602 includes hardware for executing instructions, such as those making up a computer program. As an example, and not by way of limitation, to execute instructions, processor 1602 may retrieve (or fetch) the instructions from an internal register, an internal cache, memory 1604, or storage device 1606 and decode and execute them. In particular embodiments, processor 1602 may include one or more internal caches for data, instructions, or addresses. As an example, and not by way of limitation, processor 1602 may include one or more instruction caches, one or more data caches, and one or more translation lookaside buffers (TLBs). Instructions in the instruction caches may be copies of instructions in memory 1604 or storage device 1606.

Memory 1604 may be used for storing data, metadata, and programs for execution by the processor(s). Memory 1604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1604 may be internal or distributed memory.

Storage device 1606 includes storage for storing data or instructions. As an example, and not by way of limitation, storage device 1606 can comprise a non-transitory storage medium described above. Storage device 1606 may include a hard disk drive (HDD), a floppy disk drive, flash memory, an optical disc, a magneto-optical disc, magnetic tape, or a Universal Serial Bus (USB) drive or a combination of two or more of these. Storage device 1606 may include removable or non-removable (or fixed) media, where appropriate. Storage device 1606 may be internal or external to computing device 1600. In particular embodiments, storage device 1606 is non-volatile, solid-state memory. In other embodiments, Storage device 1606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1608 allows a user to provide input to, receive output from, and otherwise transfer data to and receive data from computing device 1600. I/O interface 1608 may include a mouse, a keypad or a keyboard, a touch screen, a camera, an optical scanner, network interface, modem, other known I/O devices or a combination of such I/O interfaces. I/O interface 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1608 is configured to provide graphical data to a display for presentation to a user. The graphical data may be representative of one or more graphical user interfaces and/or any other graphical content as may serve a particular implementation.

Communication interface 1610 can include hardware, software, or both. In any event, communication interface 1610 can provide one or more interfaces for communication (such as, for example, packet-based communication) between computing device 1600 and one or more other computing devices or networks. As an example, and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1610 may facilitate communications with a wireless PAN (WPAN) (such as, for example, a BLUETOOTH® WPAN), a Wireless Fidelity (WI-FI®) network, a Worldwide Interoperability for Microwave Access (WiMAX™) network, a cellular telephone network (such as, for example, a Global System for Mobile Communications (GSM™) network), or other suitable wireless network or a combination thereof.

Additionally, communication interface 1610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1612 may include hardware, software, or both that couples components of computing device 1600 to each other. As an example and not by way of limitation, communication infrastructure 1612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital media environment in which paper forms are converted into corresponding fillable digital forms, a method comprising:
   using a form conversion neural network trained to determine semantic structures of digitized paper forms by:
      generating a feature map by processing a digitized paper form comprising a plurality of pixels using a neural network encoder;
      determining, for the plurality of pixels, one or more low-level semantic characteristics indicative of one or more low-level element types of content within the digitized paper form by processing the feature map using a neural network low-level semantic decoder; and
      determining, for the plurality of pixels, one or more high-level semantic characteristics indicative of one or more high-level element types of content within the digitized paper form by processing the feature map using one or more neural network high-level semantic decoders that are in parallel with the neural network low-level semantic decoder; and
   generating a fillable digital form based on the determined one or more low-level semantic characteristics and the determined one or more high-level semantic characteristics of the digitized paper form.

2. The method of claim 1, further comprising:
   generating a reconstructed layout corresponding to the digitized paper form using a trained form conversion neural network reconstruction decoder,
   wherein generating the fillable digital form is further based on the reconstructed layout.

3. The method of claim 1, wherein:
   determining the one or more low-level semantic characteristics comprises determining one or more of a text run, a widget, an image, or an element border,
   determining the one or more high-level semantic characteristics comprises determining one or more of a text block, a field, a list, or a table.

4. A non-transitory computer readable storage medium including a set of instructions that, when executed by at least one processor, cause a computing device to:
   use a form conversion neural network trained to determine semantic structures of digitized paper forms by:
      generating a feature map by processing a digitized paper form comprising a plurality of pixels using a neural network encoder;
      determining, for the plurality of pixels, one or more low-level semantic characteristics indicative of one or more low-level element types of content within the digitized paper form by processing the feature map using a neural network low-level semantic decoder; and
      determining, for the plurality of pixels, one or more high-level semantic characteristics indicative of one or more high-level element types of content within the digitized paper form by processing the feature map using one or more neural network high-level semantic decoders that are in parallel with the neural network low-level semantic decoder; and generate a fillable digital form based on the determined one or more low-level semantic characteristics and the determined one or more high-level semantic characteristics.

5. The non-transitory computer readable storage medium of claim 4, further comprising instructions that, when executed by the at least one processor, cause the computing device to:

generate a low-level semantic segmentation map based on the determined one or more low-level semantic characteristics for the plurality of pixels; and generate one or more high-level semantic segmentation maps based on the determined one or more high-level semantic characteristics for the plurality of pixels.

6. The non-transitory computer readable storage medium of claim 5, further comprising instructions that, when executed by the at least one processor, cause the computing device to process the feature map using a neural network reconstruction decoder to generate a reconstructed layout corresponding to the digitized paper form, wherein, the instructions, when executed by the at least one processor, cause the computing device to generate the fillable digital form further based on the reconstructed layout.

7. The non-transitory computer readable storage medium of claim 6, wherein the instructions, when executed by the at least one processor, cause the computing device to generate the fillable digital form by combining the low-level semantic segmentation map, the one or more high-level semantic segmentation maps, and the reconstructed layout.

8. The non-transitory computer readable storage medium of claim 4, wherein determining one or more low-level semantic characteristics for the plurality of pixels by processing the feature map using a neural network low-level semantic decoder comprises:

passing an encoder-layer-level feature map from a layer of the neural network encoder directly to a corresponding layer of the neural network low-level semantic decoder using a skip connection; and combining the encoder-layer-level feature map with a previous feature map of a previous layer of the neural network low-level semantic decoder.

9. The non-transitory computer readable storage medium of claim 4, wherein determining one or more high-level semantic characteristics for the plurality of pixels by processing the feature map using the one or more neural network high-level semantic decoders comprises:

passing an encoder-layer-level feature map from a layer of the neural network encoder directly to a corresponding layer of a neural network high-level semantic decoder of the one or more neural network high-level semantic decoders using a skip connection; and combining the encoder-layer-level feature map with a previous feature map of a previous layer of the neural network high-level semantic decoder.

10. The non-transitory computer readable storage medium of claim 4, further comprising instructions that, when executed by the at least one processor, cause the computing device to use the form conversion neural network trained to determine semantic structures of digitized paper forms by generating a common trunk feature map by processing the feature map using a form conversion neural network common semantic segmentation trunk.

11. The non-transitory computer readable storage medium of claim 10, wherein generating a common trunk feature map by processing the feature map using the form conversion neural network common semantic segmentation trunk comprises:

passing an encoder-layer-level feature map from a layer of the neural network encoder directly to a corresponding layer of the form conversion neural network common semantic segmentation trunk using a skip connection; and combining the encoder-layer-level feature map with a previous feature map of a previous layer of the form conversion neural network common semantic segmentation trunk to generate a combined feature map.

12. The non-transitory computer readable storage medium of claim 11, wherein combining the encoder-layer-level feature map with the previous feature map comprises concatenating the encoder-layer-level feature map with the previous feature map.

13. The non-transitory computer readable storage medium of claim 11, wherein:

determining one or more low-level semantic characteristics for the plurality of pixels by processing the feature map using a neural network low-level semantic decoder comprises processing the common trunk feature map using the neural network low-level semantic decoder; and determining one or more high-level semantic characteristics for the plurality of pixels by processing the feature map using one or more neural network high-level semantic decoders comprises processing the common trunk feature map using the one or more neural network high-level semantic decoders.

14. The non-transitory computer readable storage medium of claim 4, wherein:

determining, for the plurality of pixels, the one or more low-level semantic characteristics indicative of the one or more low-level element types of content within the digitized paper form comprises determining low-level semantic characteristics indicative of at least one of a text run, a widget, an image, or a border; and determining, for the plurality of pixels, the one or more high-level semantic characteristics indicative of the one or more high-level element types of content within the digitized paper form comprises determining high-level semantic characteristics indicative of at least one of a text block, a field, a list, or a table.

15. A system for converting paper forms into corresponding fillable digital forms, comprising:

a memory comprising:

analytics training data associated with a plurality of pixels of training digitized paper forms; and a neural network encoder that outputs feature maps to a form conversion neural network reconstruction decoder, a neural network low-level semantic decoder, and one or more neural network high-level semantic decoders that are in parallel with the neural network low-level semantic decoder;

at least one server; and at least one non-transitory computer readable storage medium storing instructions thereon that, when executed by the at least one server, cause the system to:

generate a feature map by processing a digitized paper form comprising a plurality of pixels using the neural network encoder;

determine, for the plurality of pixels, one or more low-level semantic characteristics indicative of one or more low-level element types of content within the digitized paper form by processing the feature map using the neural network low-level semantic decoder; and determine, for the plurality of pixels, one or more high-level semantic characteristics indicative of one or more high-level element types of content within the digitized paper form by processing the feature map using the one or more neural network high-level semantic decoders.

16. The system of claim 15, wherein the instructions, when executed by the at least one server, cause the system to:

generate the feature map by processing the digitized paper form comprising the plurality of pixels using the neural network encoder by generating a training feature map by processing the digitized paper form using the neural network encoder;

determine one or more low-level semantic characteristics for the plurality of pixels by processing the feature map using the neural network low-level semantic decoder by processing the training feature map using the neural network low-level semantic decoder and comparing a low-level output to a low-level ground truth to determine a low-level loss;

determine one or more high-level semantic characteristics for the plurality of pixels by processing the feature map using the one or more neural network high-level semantic decoders by processing the training feature map using the one or more neural network high-level semantic decoders and comparing one or more high-level outputs to a corresponding high-level ground truth to determine one or more high-level losses;

generate a combined loss comprising the low-level loss and the one or more high-level losses; and back propagate the combined loss to modify parameters of the neural network low-level semantic decoder, the one or more neural network high-level semantic decoders, and the neural network encoder.

17. The system of claim 16, wherein the low-level output comprises a low-level semantic segmentation map and the one or more high-level outputs comprise one or more high-level semantic segmentation maps.

18. The system of claim 16, further comprising instructions that, when executed by the at least one server, cause the system to process the training feature map using the form conversion neural network reconstruction decoder and comparing a reconstruction output to a reconstruction ground truth to determine a reconstruction loss, wherein the combined loss further comprises the reconstruction loss and the instructions, when executed by the at least one server, back propagate the combined loss to further modify parameters of the form conversion neural network reconstruction decoder.

19. The system of claim 15, wherein the instructions, when executed by the at least one server, cause the system to:

determine one or more low-level semantic characteristics for the plurality of pixels by processing the feature map using a trained neural network low-level semantic decoder; and determine one or more high-level semantic characteristics for the plurality of pixels by processing the feature map using one or more trained neural network high-level semantic decoders.

20. The system of claim 15, further comprising instructions that, when executed by the at least one server, cause the system to generate a tillable digital form based on the determined one or more low-level semantic characteristics and the determined one or more high-level semantic characteristics.

* * * * *